US011416853B1

(12) United States Patent
Kolchin

(10) Patent No.: US 11,416,853 B1
(45) Date of Patent: Aug. 16, 2022

(54) SYSTEM AND METHOD FOR CONDUCTING SECURE FINANCIAL TRANSACTIONS

(71) Applicant: iWallet, Inc., San Francisco, CA (US)

(72) Inventor: Dmitriy Kolchin, San Francisco, CA (US)

( * ) Notice: Subject to any disclaimer, the term of this patent is extended or adjusted under 35 U.S.C. 154(b) by 0 days.

(21) Appl. No.: 17/229,238

(22) Filed: Apr. 13, 2021

Related U.S. Application Data

(60) Provisional application No. 63/161,590, filed on Mar. 16, 2021, provisional application No. 63/147,266, filed on Feb. 9, 2021.

(51) Int. Cl.
| | | |
|---|---|---|
| *G06Q 20/38* | (2012.01) | |
| *G06Q 20/22* | (2012.01) | |
| *G06Q 20/10* | (2012.01) | |
| *G06Q 20/40* | (2012.01) | |
| *G06Q 20/32* | (2012.01) | |

(52) U.S. Cl.
CPC ....... *G06Q 20/3821* (2013.01); *G06Q 20/108* (2013.01); *G06Q 20/227* (2013.01); *G06Q 20/3276* (2013.01); *G06Q 20/4016* (2013.01)

(58) Field of Classification Search
CPC ............. G06Q 20/3821; G06Q 20/108; G06Q 20/227; G06Q 20/3276; G06Q 20/4016
USPC ......................................................... 705/76
See application file for complete search history.

(56) References Cited

U.S. PATENT DOCUMENTS

| | | | |
|---|---|---|---|
| 7,104,443 B1 | 9/2006 | Paul et al. | |
| 7,232,060 B2 | 6/2007 | Ahles et al. | |
| 7,627,525 B2 | 12/2009 | Williams | |
| 7,783,563 B2 | 8/2010 | Tidwell et al. | |
| 7,967,195 B2 | 6/2011 | Mascavage et al. | |
| 8,055,557 B2 | 11/2011 | Sorbe et al. | |
| 8,423,453 B1 | 4/2013 | Elliott | |
| 8,459,546 B1 | 6/2013 | Block et al. | |
| 10,504,093 B1 | 12/2019 | Lewis et al. | |
| 10,839,359 B2 * | 11/2020 | Novac et al. | |
| 2007/0244811 A1 * | 10/2007 | Tumminaro | |

(Continued)

*Primary Examiner* — Neha Patel
*Assistant Examiner* — Yin Y Choi
(74) *Attorney, Agent, or Firm* — Law Office of Ilya Libenzon

(57) ABSTRACT

A system and method to conduct secure electronic financial transactions are provided. The system includes one or more processors and one or more memories having stored thereon instructions that, when executed by the one or more processors, cause the one or more processors to identify a first payment source account held by an account holder and a second account held by the account holder; receive transaction data associated with a transaction initiated by the account holder with a merchant using the first payment source account, the transaction having a transaction amount; request via a first network a first transfer of the transaction amount from the first payment source account within a predetermined time; perform a pre-authorization charge of the second account in a pre-authorized amount; transfer the transaction amount to pay the merchant; and if the first transfer is not completed within the predetermined time, request via the second network a second transfer of the pre-authorized amount from the second account; and release the pre-authorization charge of the second account if the transaction amount was successfully transferred from the first account within the predetermined time.

20 Claims, 22 Drawing Sheets

(56) References Cited

U.S. PATENT DOCUMENTS

2011/0320354 A1   12/2011  Coon
2013/0066778 A1*  3/2013  Davis et al.
2014/0358776 A1* 12/2014  Xu et al.
2017/0262828 A1   9/2017  Luciani

* cited by examiner

SYSTEM AND METHOD FOR CONDUCTING SECURE FINANCIAL TRANSACTIONS

CROSS-REFERENCE TO RELATED APPLICATIONS

This application claims the benefit of U.S. provisional patent application No. 63/147,266 filed on Feb. 9, 2021 and U.S. provisional patent application No. 63/161,590 filed on Mar. 16, 2021, the contents of which are incorporated by reference in their entirety.

TECHNICAL FIELD

The present invention relates to a system and computer-implemented methods for conducting secure electronic financial transactions.

BACKGROUND ART

Electronic transactions make it possible to conduct a payment efficiently and with minimal physical interaction between a consumer and a merchant. However, electronic transactions come with a number of risks to both the merchant and the consumer. Since surcharge fees laws changed, a consumer can be responsible for paying the processing fee. These processing fees can vary depending on the card chosen for the transaction, meaning that a consumer could pay a high fee when a lower fee was possible. In addition, surcharging does not work for tips collected at a restaurant because a restaurant cannot add a fee on top of the tips on the check after the consumer has left the building.

Also commonly used are automated clearing house (ACH) transactions. ACH is a form of electronic payment. Specifically, ACH is an electronic fund transfer through an ACH network including the Federal Reserve Bank from one account to another account, such as to a checking or savings account. ACH is typically used to process payments for settlement within a period of time, such as a few business days. ACH transactions are settled in a manner similar to the way checks are settled. The clearinghouse takes all ACH files received daily from its member banks, sorts them by the originating bank (the bank where the check was cashed or deposited) and the paying bank (the bank against which the check was drawn), totals the accounts, and credits or debits appropriate accounts accordingly.

When the transaction is an automated clearing house (ACH) transaction, there is a risk that the transaction will not finalize because it takes days to process an ACH transaction. The use of applications on computing devices allow for these electronic transactions to be calculated in real-time meaning that tips can be calculated in real-time on the customer's phone. This is further possible because information from the bank identification number (BIN) and other data make it possible to detect the fee in real time.

Therefore, there is a need for a system that calculates electronic transactions and their respective surcharges in real-time as well as a system that secures payment when the original payment does not go through.

SUMMARY OF THE EMBODIMENTS

The present invention relates to conducting electronic transactions through a computing device between a consumer and a merchant. The present invention proposes to introduce a novel process to conduct electronic transactions in real-time. This novel process will allow a consumer to determine the total payment including the exact surcharge before processing the electronic payment. In addition, this novel process will allow a merchant to receive a final electronic payment in real-time because this system mandates a primary e-check payment and a back-up credit card payment.

The back-up credit card payment is a pre-authorized feature that secures the e-check. This means if the e-check payment bounces, the credit card payment can be immediately charged. If the e-check does not bounce, then the credit card payment will be released. This system will give the merchant the ability to recoup losses by the use any connected payment source in case the original ACH transaction has failed. The transactions may include, but are not limited to credit cards, debit cards, and automated clearing house (ACH). A consumer will be able to automatically choose payment method based on merchant type and payment source type.

In order to utilize this invention, a consumer will need to set up a consumer account by visiting a website. Once the account is set, a consumer will need to connect a bank checking account to fund the iWallet account and add a credit card.

In some embodiments the electronic transaction will be conducted on a consumer's mobile phone. The mobile phone possesses capabilities of GPS location identification, radio and near-frequency communication capabilities, mobile data/internet functionality, optical scanning capabilities, and have a mobile payment application that scans a QR code. QR codes can be printed on paper, stickers, or any other physical media. The electronic payment will initiate when the merchant sends a payment by email, text, or QR-code.

Use of this system will help to resolve disputes for ACH and CC payments because this novel system will provide more context in terms of GPS location, description of the business, and notes of the transactions.

In addition, this system will refund excessive processing fees. This system will have a maximum cap of 4% for any additional surcharge for a credit card. Please note that debit surcharging is not allowed, therefore there are no surcharges for a debit card payment.

An e-check can be secured by any back-up payment method. In one embodiment, a merchant does not have to change their existing credit card processor. It is possible to control pre-authorization and release of pre-authorization via API of any processor to secure an ACH transaction.

Furthermore, the ability for a consumer to reverse a credit card processing payment and fee is possible if it is reversed within a predetermined amount of time if they pay the same amount with ACH or other free/cheaper network.

Other aspects, embodiments and features of the device and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood, however, that neither the device nor the method is limited to the precise arrangements and instrumentalities shown.

DETAILED DESCRIPTION OF SPECIFIC EMBODIMENTS

Some embodiments of the disclosed system and methods will be better understood by reference to the following comments concerning computing devices. A "computing device" 100 may be defined as including personal computers, laptops, tablets, smart phones, and any other computing device capable of supporting an application as described herein. The system and method disclosed herein will be better understood in light of the following observations concerning the computing devices that support the disclosed application, and concerning the nature of web applications in general.

Figure 4:
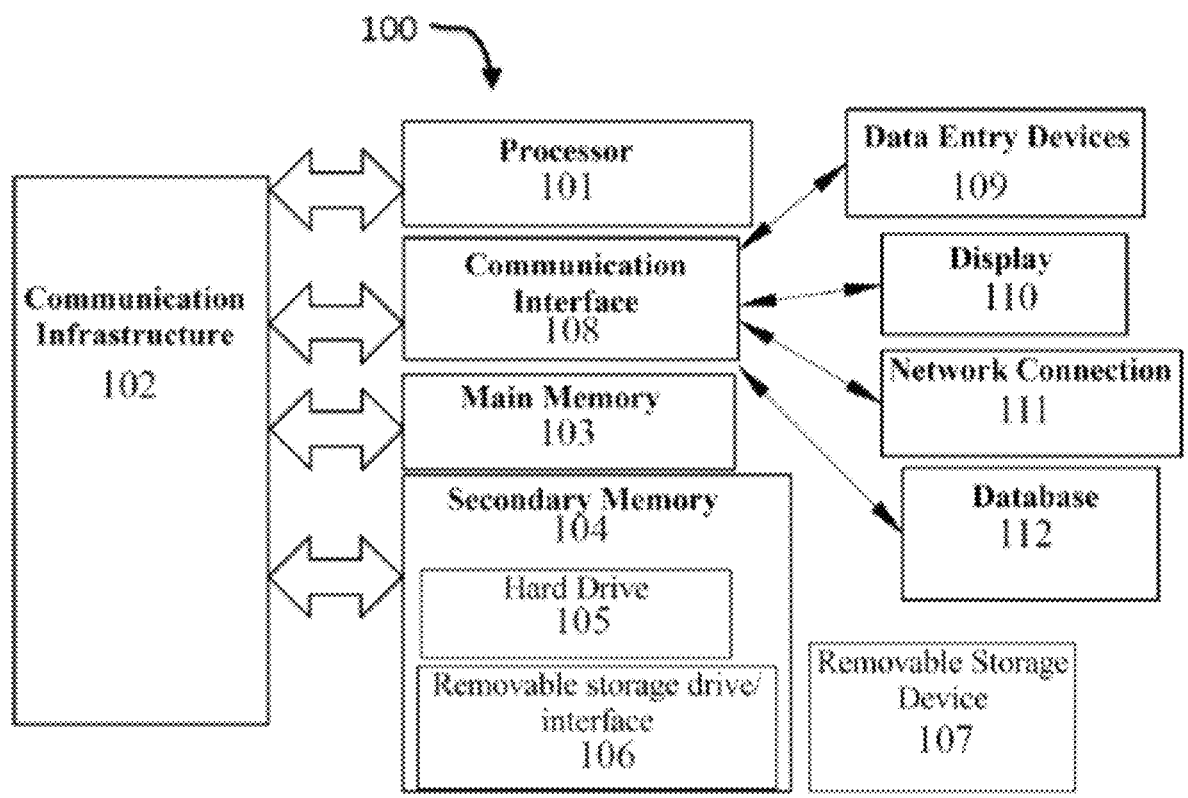
FIG. 4 is a block diagram depicting an example of a computing device as described herein.

Referring now to the drawings in detail. An exemplary computing device is illustrated by FIG. 4. The processor 101 may be a special purpose or a general-purpose processor device. As will be appreciated by persons skilled in the relevant art, the processor device 101 may also be a single processor in a multi-core/multiprocessor system, such system operating alone, or in a cluster of computing devices operating in a cluster or server farm. The processor 101 is connected to a communication infrastructure 102, for example, a bus, message queue, network, or multi-core message-passing scheme.

The computing device also includes a main memory 103, such as random access memory (RAM), and may also include a secondary memory 104. Secondary memory 104 may include, for example, a hard disk drive 105, a removable storage drive or interface 106, connected to a removable storage unit 107, or other similar means. As will be appreciated by persons skilled in the relevant art, a removable storage unit 107 includes a computer usable storage medium having stored therein computer software and/or data. Examples of additional means creating secondary memory 104 may include a program cartridge and cartridge interface (such as that found in video game devices), a removable memory chip (such as an EPROM, or PROM) and associated socket, and other removable storage units 107 and interfaces 106 which allow software and data to be transferred from the removable storage unit 107 to the computer system. In some embodiments, to "maintain" data in the memory of a computing device means to store that data in that memory in a form convenient for retrieval as required by the algorithm at issue, and to retrieve, update, or delete the data as needed.

The computing device may also include a communications interface 108. The communications interface 108 allows software and data to be transferred between the computing device and external devices. The communications interface 108 may include a modem, a network interface (such as an Ethernet card), a communications port, a PCMCIA slot and card, or other means to couple the computing device to external devices. Software and data transferred via the communications interface 108 may be in the form of signals, which may be electronic, electromagnetic, optical, or other signals capable of being received by the communications interface 108. These signals may be provided to the communications interface 108 via wire or cable, fiber optics, a phone line, a cellular phone link, and radio frequency link or other communications channels. Other devices may be coupled to the computing device 100 via the communications interface 108. In some embodiments, a device or component is "coupled" to a computing device 100 if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device 100 may be coupled to a second computing device (not shown); for instance, a server may be coupled to a client device, as described below in greater detail.

The communications interface in the system embodiments discussed herein facilitates the coupling of the computing device with data entry devices 109, the device's display 110, and network connections, whether wired or wireless 111. In some embodiments, "data entry devices"

109 are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers. In some embodiments, a computing device's "display" 109 is a device coupled to the computing device, by means of which the computing device can display images. Display include without limitation monitors, screens, television devices, and projectors.

Computer programs (also called computer control logic) are stored in main memory 103 and/or secondary memory 104. Computer programs may also be received via the communications interface 108. Such computer programs, when executed, enable the processor device 101 to implement the system embodiments discussed below. Accordingly, such computer programs represent controllers of the system. Where embodiments are implemented using software, the software may be stored in a computer program product and loaded into the computing device using a removable storage drive or interface 106, a hard disk drive 105, or a communications interface 108.

Computer program code for carrying out operations of the present invention may be written in an object oriented programming language such as, but not limited to, Java, Smalltalk or C++. However, the computer program code for carrying out operations of the present invention may also be written in conventional procedural programming languages such as the "C" programming language. Computer readable program instructions for carrying out operations of the present invention may also be assembler instructions, instruction-set-architecture (ISA) instructions, machine instructions, machine dependent instructions, microcode, firmware instructions, state-setting data, or either source code or object code written in any combination of one or more programming languages described above. In some instances, the computer readable program can be executed in the reverse order, depending upon the functionality involved. It will also be noted that each block of the flowchart illustrations, and combinations of blocks in the flowchart illustrations, can be implement by special purpose hardware-based systems that perform the specified functions or acts or carry out combinations of special purpose hardware and computer instructions.

The computing device may also store data in database 112 accessible to the device. A database 112 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 112, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor 101, a communication infrastructure 102, at least a main memory 103, and usually a communications interface 108, not all devices will necessarily house these facilities separately. For instance, in some forms of computing devices as defined above, processing 101 and memory 103 could be distributed through the same hardware device, as in a neural net, and thus the communications infrastructure 102 could be a property of the configuration of that particular hardware device. Many devices do practice a physical division of tasks as set forth above, however, and practitioners skilled in the art will understand the conceptual separation of tasks as applicable even where physical components are merged.

The computing device 100 may employ one or more security measures to protect the computing device 100 or its data. For instance, the computing device 100 may protect data using a cryptographic system. In one embodiment, a cryptographic system is a system that converts data from a first form, known as "plaintext," which is intelligible when viewed in its intended format, into a second form, known as "cyphertext," which is not intelligible when viewed in the same way. The cyphertext may be unintelligible in any format unless first converted back to plaintext. In one embodiment, the process of converting plaintext into cyphertext is known as "encryption." The encryption process may involve the use of a datum, known as an "encryption key," to alter the plaintext. The cryptographic system may also convert cyphertext back into plaintext, which is a process known as "decryption." The decryption process may involve the use of a datum, known as a "decryption key," to return the cyphertext to its original plaintext form. In embodiments of cryptographic systems that are "symmetric," the decryption key is essentially the same as the encryption key: possession of either key makes it possible to deduce the other key quickly without further secret knowledge. The encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Figure 5:
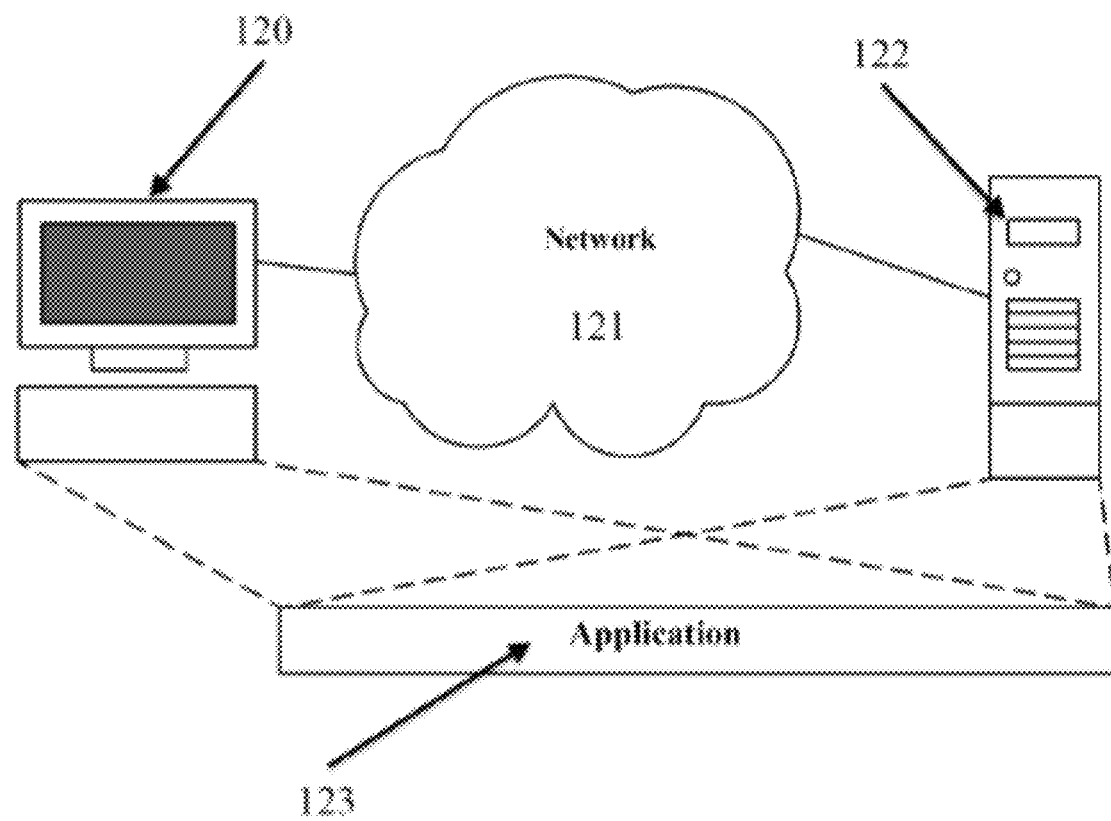
FIG. 5 is a block diagram depicting an example of a network-based platform, as described herein.

The systems may be deployed in a number of ways, including on a stand-alone computing device, a set of computing devices working together in a network, or a web application. Persons of ordinary skill in the art will recognize a web application as a particular kind of computer program system designed to function across a network, such as the Internet. A schematic illustration of a web application platform is provided in FIG. 5. Web application platforms typically include at least one client device 120, which is a computing device as described above. The client device 120 connects via some form of network connection to a network 121, such as the Internet. The network 121 may be any arrangement that links together computing devices 120, 122, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 121 is at least one server 122, which is also a computing device as described above, or a set of computing devices that communicate with each other and work in concert by local or network connections. Of course, practitioners of ordinary skill in the relevant art will recognize that a web application can, and typically does, run on several servers 122 and a vast and continuously changing population of client devices 120. Computer programs on both the client device 120 and the server 122 configure both devices to perform the functions required of the web application 123. Web applications 123 can be designed so that the bulk of their processing tasks are accomplished by the server 122, as configured to perform those tasks by its web application program, or alternatively by the client device 120. Some web applications 123 are designed so that the client device 120 solely displays content that is sent to it by the server 122, and the server 122 performs all of the processing, business logic, and data storage tasks. Such "thin client" web applications are sometimes referred to as "cloud" applications, because essentially all computing tasks are performed by a set of servers 122 and data centers visible to the client only as a single opaque entity, often represented on diagrams as a cloud.

Many computing devices, as defined herein, come equipped with a specialized program, known as a web browser, which enables them to act as a client device 120 at least for the purposes of receiving and displaying data output by the server 122 without any additional programming. Web browsers can also act as a platform to run so much of a web application as is being performed by the client device 120, and it is a common practice to write the portion of a web application calculated to run on the client device 120 to be operated entirely by a web browser. Such browser-executed programs are referred to herein as "client-side programs," and frequently are loaded onto the browser from the server 122 at the same time as the other content the server 122 sends to the browser. However, it is also possible to write programs that do not run on web browsers but still cause a computing device to operate as a web application client 120. Thus, as a general matter, web applications 123 require some computer program configuration of both the client device (or devices) 120 and the server 122. The computer program that comprises the web application component on either computing device's system FIG. 4 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

The one or more client devices 120 and the one or more servers 122 may communicate using any protocol according to which data may be transmitted from the client 120 to the server 122 and vice versa. As a non-limiting example, the client 120 and server 122 may exchange data using the Internet protocol suite, which includes the transfer control protocol (TCP) and the Internet Protocol (IP), and is sometimes referred to as TCP/IP. In some embodiments, the client and server 122 encrypt data prior to exchanging the data, using a cryptographic system as described above. In one embodiment, the client 120 and server 122 exchange the data using public key cryptography; for instance, the client and the server 122 may each generate a public and private key, exchange public keys, and encrypt the data using each others' public keys while decrypting it using each others' private keys.

In some embodiments, the client 120 authenticates the server 122 or vice-versa using digital certificates. In one embodiment, a digital certificate is a file that conveys information and links the conveyed information to a "certificate authority" that is the issuer of a public key in a public key cryptographic system. The certificate in some embodiments contains data conveying the certificate authority's authorization for the recipient to perform a task. The authorization may be the authorization to access a given datum. The authorization may be the authorization to access a given process. In some embodiments, the certificate may identify the certificate authority.

The linking may be performed by the formation of a digital signature. In one embodiment, a digital signature is an encrypted mathematical representation of a file using the private key of a public key cryptographic system. The signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if the mathematical representation of the file is well-designed and implemented correctly, any alteration of the file will result in a mismatch with the digital signature; the mathematical representation may be produced using an alteration-sensitive, reliably reproducible algorithm, such as a hashing algorithm. A mathematical representation to which the signature may be compared may be included with the signature, for verification purposes; in other embodiments, the algorithm used to produce the mathematical representation is publicly available, permitting the easy reproduction of the mathematical representation corresponding to any file. In some embodiments, a third party known as a certificate authority is available to verify that the possessor of the private key is a particular entity; thus, if the certificate authority may be trusted, and the private key has not been stolen, the ability of an entity to produce a digital signature confirms the identity of the entity, and links the file to the entity in a verifiable way. The digital signature may be incorporated in a digital certificate, which is a document authenticating the entity possessing the private key by authority of the issuing certificate authority and signed with a digital signature created with that private key and a mathematical representation of the remainder of the certificate. In other embodiments, the digital signature is verified by comparing the digital signature to one known to have been created by the entity that purportedly signed the digital signature; for instance, if the public key that decrypts the known signature also decrypts the digital signature, the digital signature may be considered verified. The digital signature may also be used to verify that the file has not been altered since the formation of the digital signature.

The server 122 and client 120 may communicate using a security combining public key encryption, private key encryption, and digital certificates. For instance, the client 120 may authenticate the server 122 using a digital certificate provided by the server 122. The server 122 may authenticate the client 120 using a digital certificate provided by the client 120. After successful authentication, the device that received the digital certificate possesses a public key that corresponds to the private key of the device providing the digital certificate; the device that performed the authentication may then use the public key to convey a secret to the device that issued the certificate. The secret may be used as the basis to set up private key cryptographic communication between the client 120 and the server 122; for instance, the secret may be a private key for a private key cryptographic system. The secret may be a datum from which the private key may be derived. The client 120 and server 122 may then use that private key cryptographic system to exchange information until the secure communication protocol in which they are communicating ends. In some embodiments, this handshake and secure communication protocol is implemented using the secure sockets layer (SSL) protocol. In other embodiments, the protocol is implemented using the transport layer security (TLS) protocol. The server 122 and client 120 may communicate using hyper-text transfer protocol secure (HTTPS).

Figure 1:
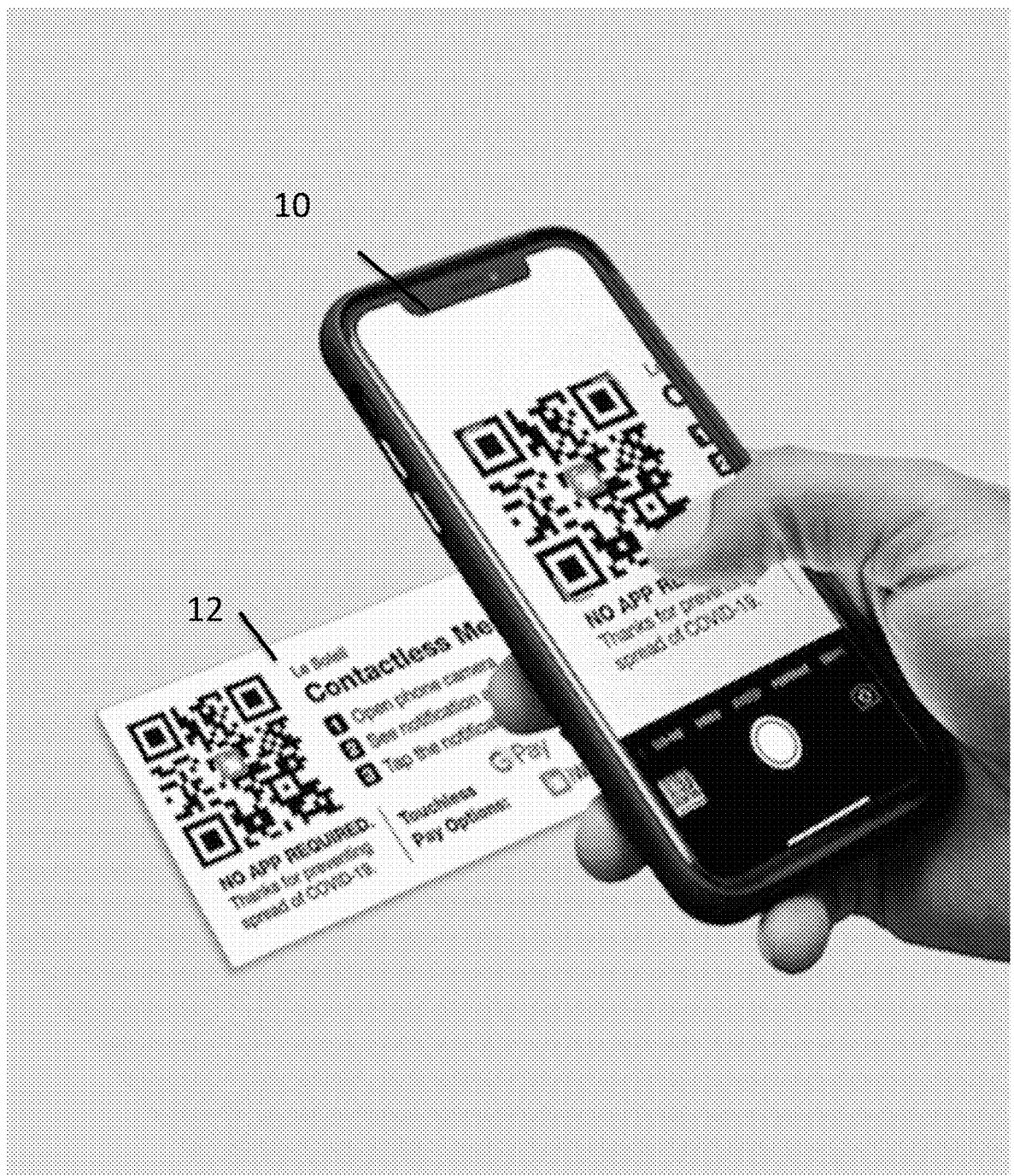
FIG. 1 is a front perspective view of a computing device initiating the electronic payment process.
Figure 6:
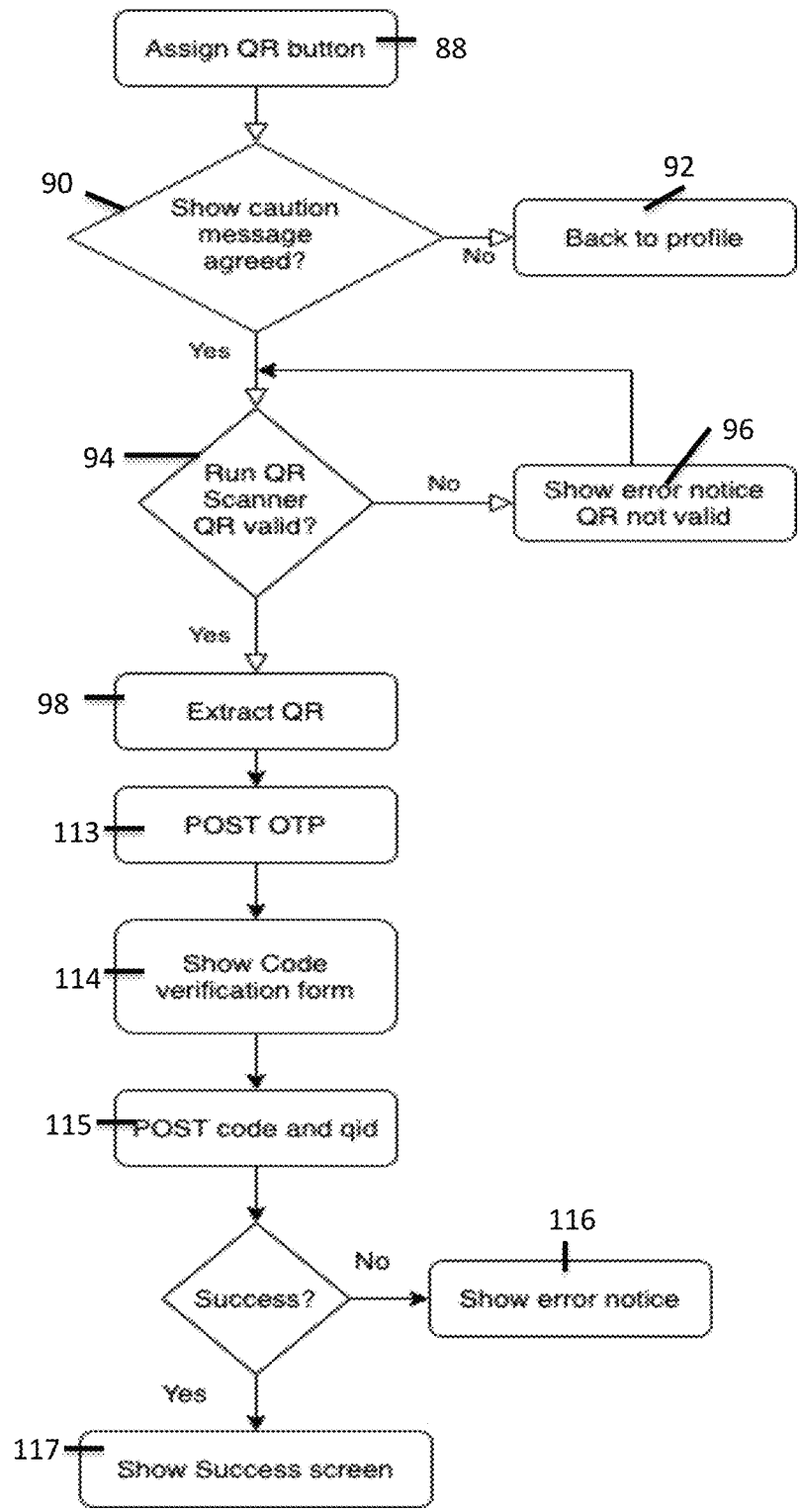
FIG. 6 shows a general flow of the process to assign a new QR-code according to various embodiments of the disclosure.

As illustrated in FIG. 1, there is shown a front perspective view of a mobile device 10 scanning the QR code on a paper card 12 using the built-in camera. In some embodiments, the QR code can be printed on other mediums such as sticker, laminate, and transparency. FIG. 6 illustrates a general flow of the process to assign a new QR code for a merchant. A QR code will contain data related to the merchant. The consumer will need to open up the software application on their mobile device 88. A caution message 90 will pop up prior to scanning the QR code. Once a consumer agrees, the built-in camera on the mobile device will scan the QR information onto the web-based application 94, 98. If the QR code is not valid, an error notice will appear 96. If the QR code is valid, the web-application will send a one-time passcode (OTP) 113 to the consumer's mobile device through an email or text. On the web-application, a code verification form will pop up 114, the OTP will need to be manually input onto the code verification form 115. If the OTP is input incorrectly, an error notice will appear 116, if the OTP is input correctly, a success screen will pop up 117.

Figure 2:
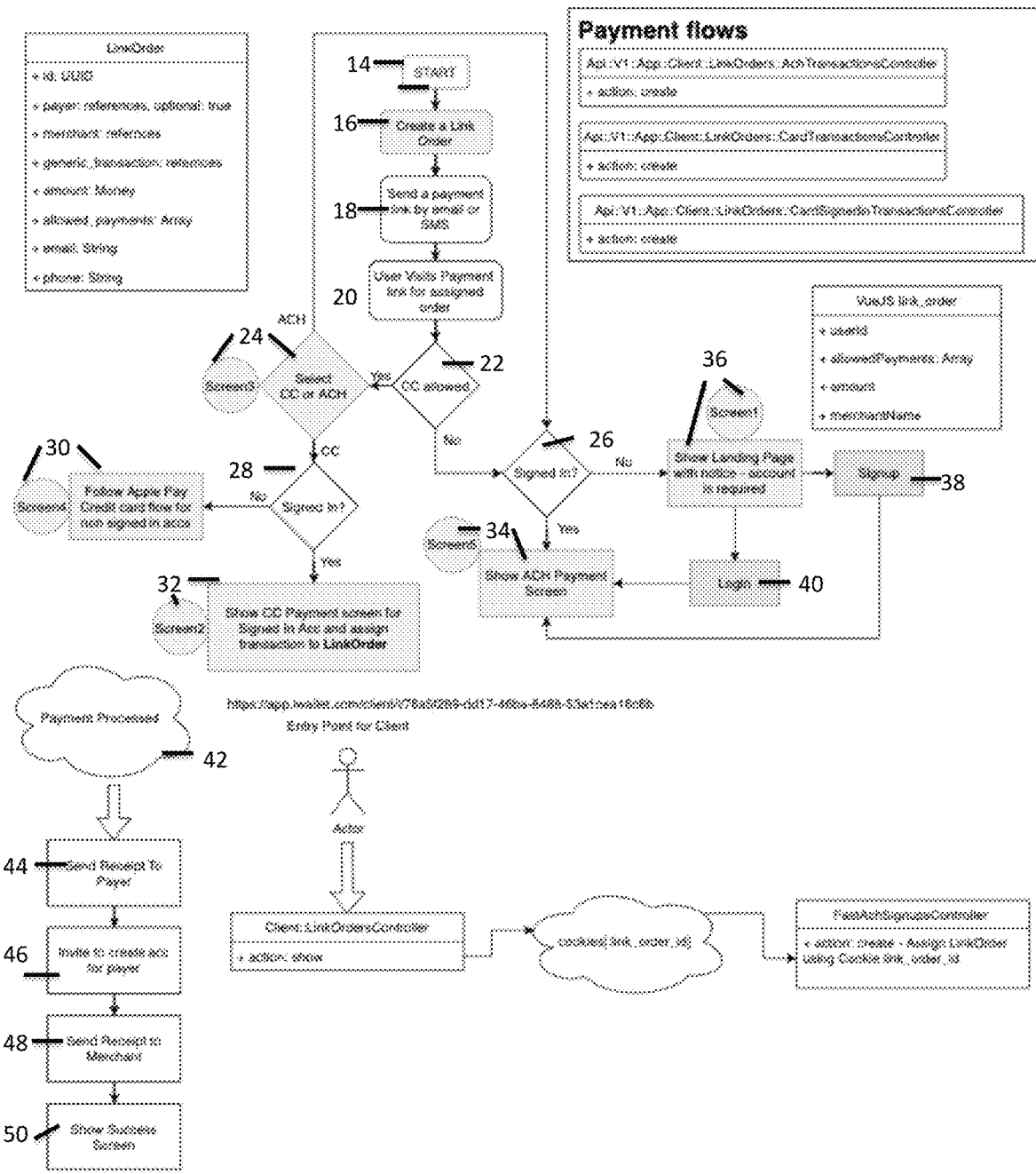
FIG. 2 shows a schematic view of a merchant-controlled payments processing link according to various embodiments of the disclosure.

FIG. 2 demonstrates a schematic view of a merchant-controlled payments processing link. The merchant creates a link 16 and sends the link by email or text 18. The user will visit the payment link for the assigned order 20. The process followed to complete the transaction will depend if a credit card is allowed 22, if the consumer selects a credit card or ACH 24, if the consumer has signed up for a consumer account 38, or if they're logged in 40. After the payment is processed 42, the consumer and merchant will receive a receipt 44 and 48.

Figure 10A:
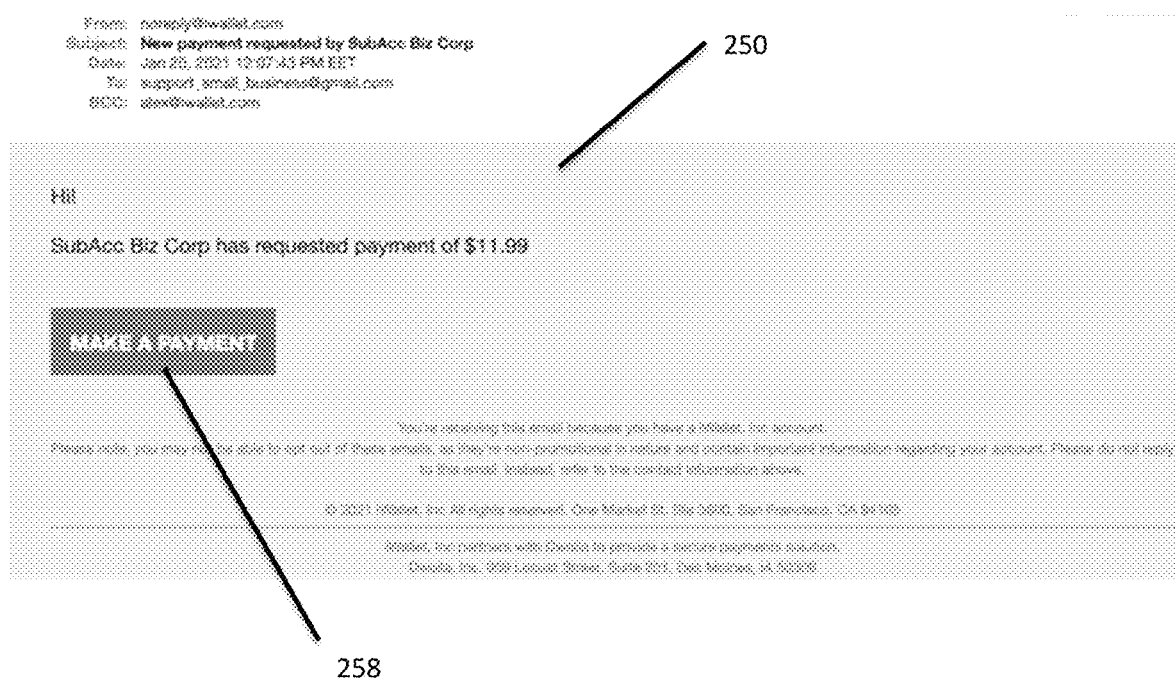
FIGS. 10A-10D show the steps taken to pay using the web-based application.
Figure 10B:
Figure 10C:
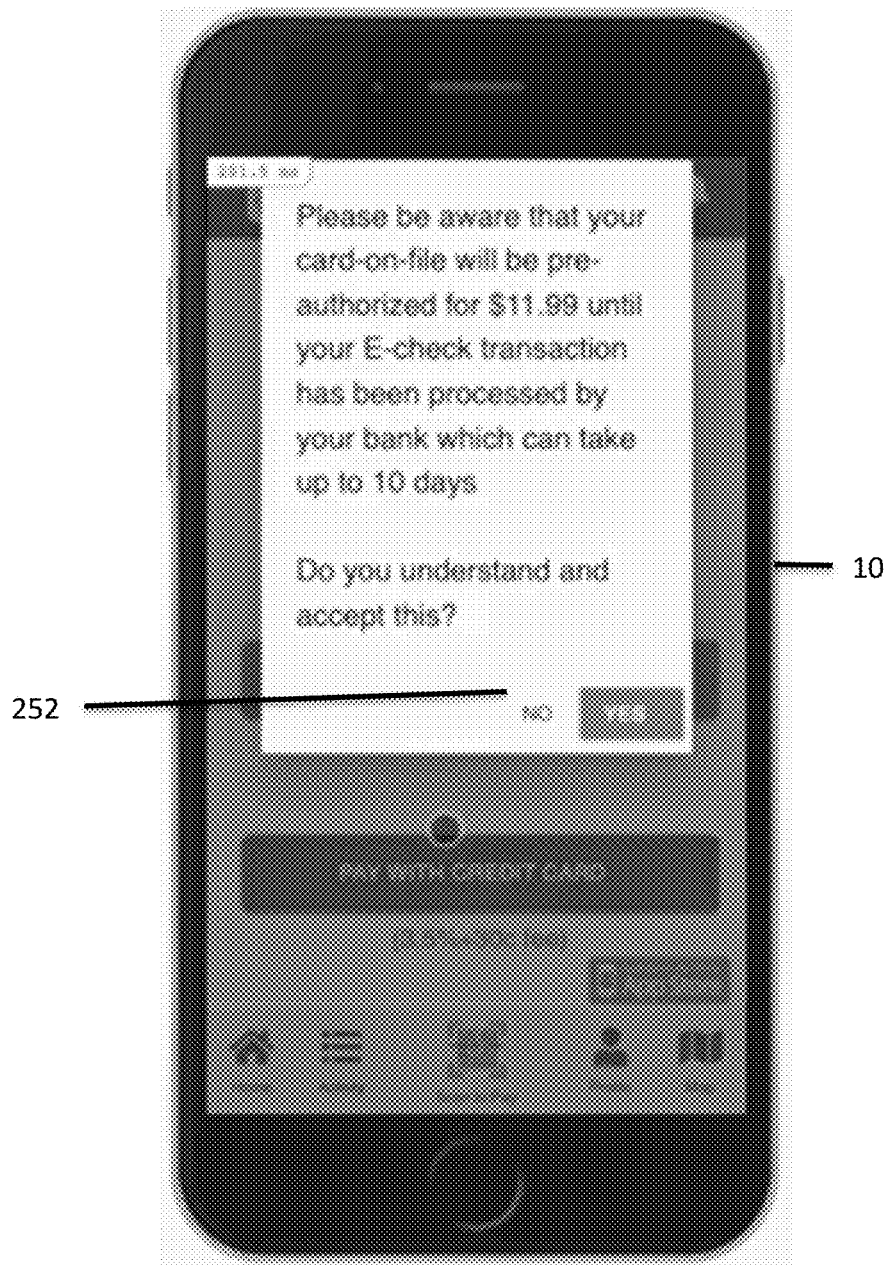
Figure 10D:

FIGS. 10A-10D depict the steps as they appear on a mobile phone. In this embodiment, the merchant sent a payment link through email 250 with a clickable button that allows for the consumer to make a payment 258. FIG. 10B displays a screen showing the requested payment with two options to complete the payment 256. According to law, there can be no additional surcharge on an ACH transaction, therefore there is no fee attached to the e-check option. The credit card option demonstrates the surcharge amount that will be added to the payment requested, therefore a consumer and merchant can determine if the transaction will be finalized and what the total charge will be. A notice appears once a payment option is selected 252. In this embodiment, the credit card option was selected as can be seen in FIG. 10C. FIG. 10D displays a payment successful screen demonstrating that the payment was finalized and instantly indicates the total charge of the electronic transaction 254.

Figure 7:
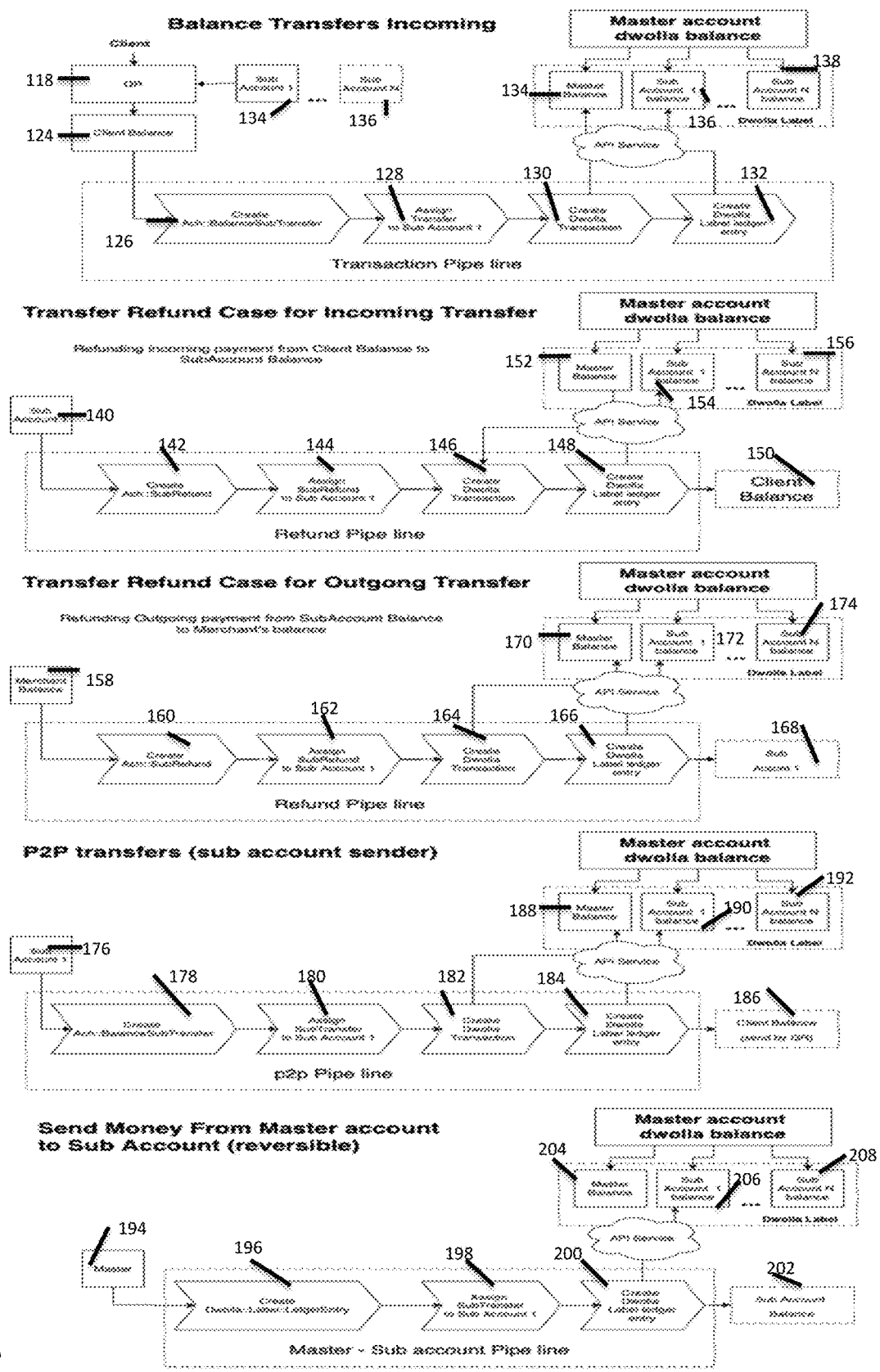
FIG. 7 depicts a schematic view of the process to create sub-accounts according to various embodiments of the disclosure.

FIG. 7 depicts a schematic view of the process to create sub-accounts. 118-138 show step by step how to create a sub account and how to transfer incoming money. 140-156 depict the steps taken to refund incoming payment from client balance to subaccount balance. 158-174 demonstrate the steps taken to refund outgoing payment from subaccount balance to merchant's balance. 176-192 demonstrates the steps taken for a p2p Pipe line transfer. 194-208 demonstrate the steps taken to send money from a master account to a sub account. This transfer can go either way thus it is reversible.

Figure 3:
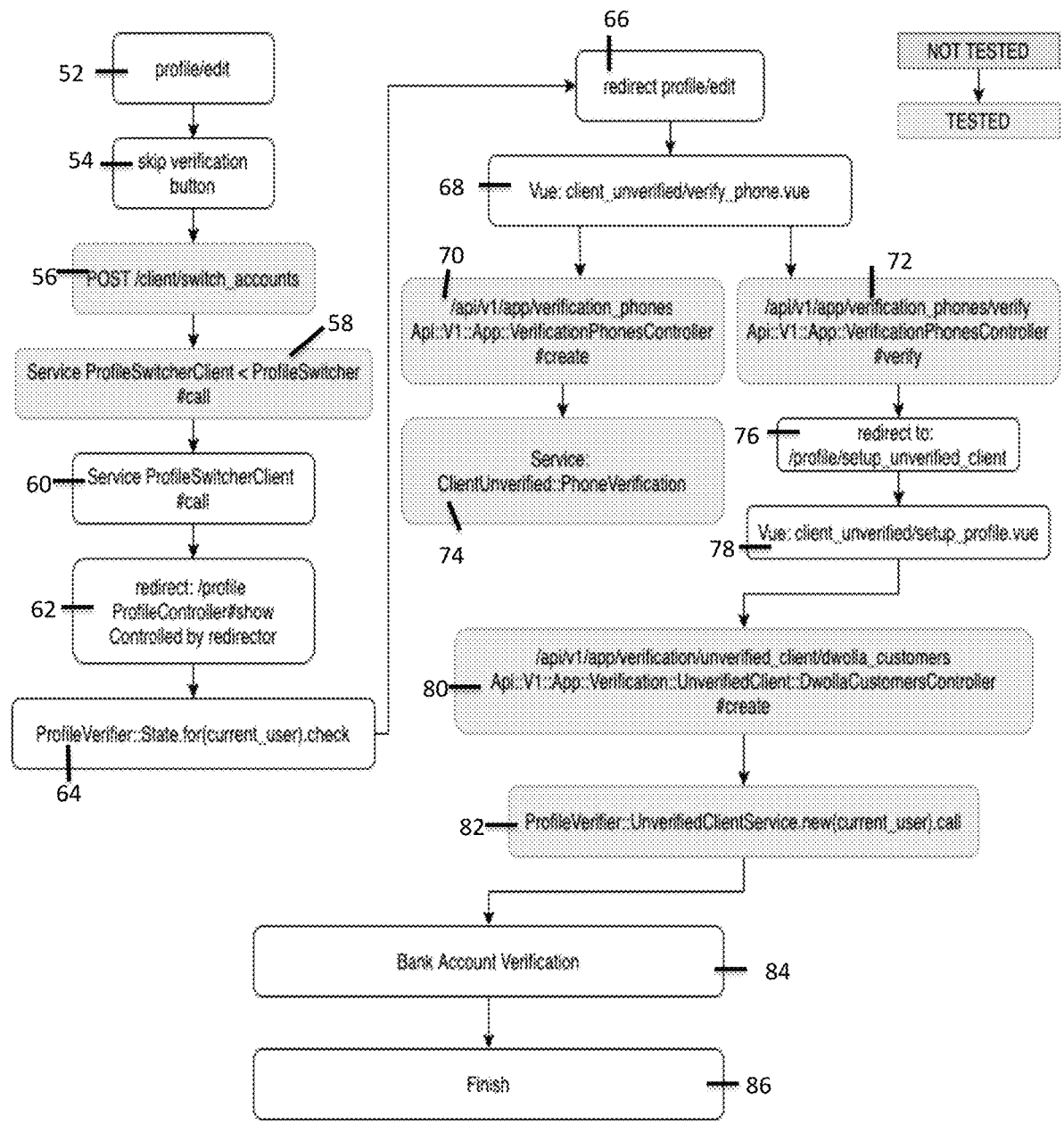
FIG. 3 depicts an exemplary flow chart that illustrates an exemplary method for returning a customer to the same profile/edit page after signing up for e-check according to various embodiments of the disclosure.
Figure 8:
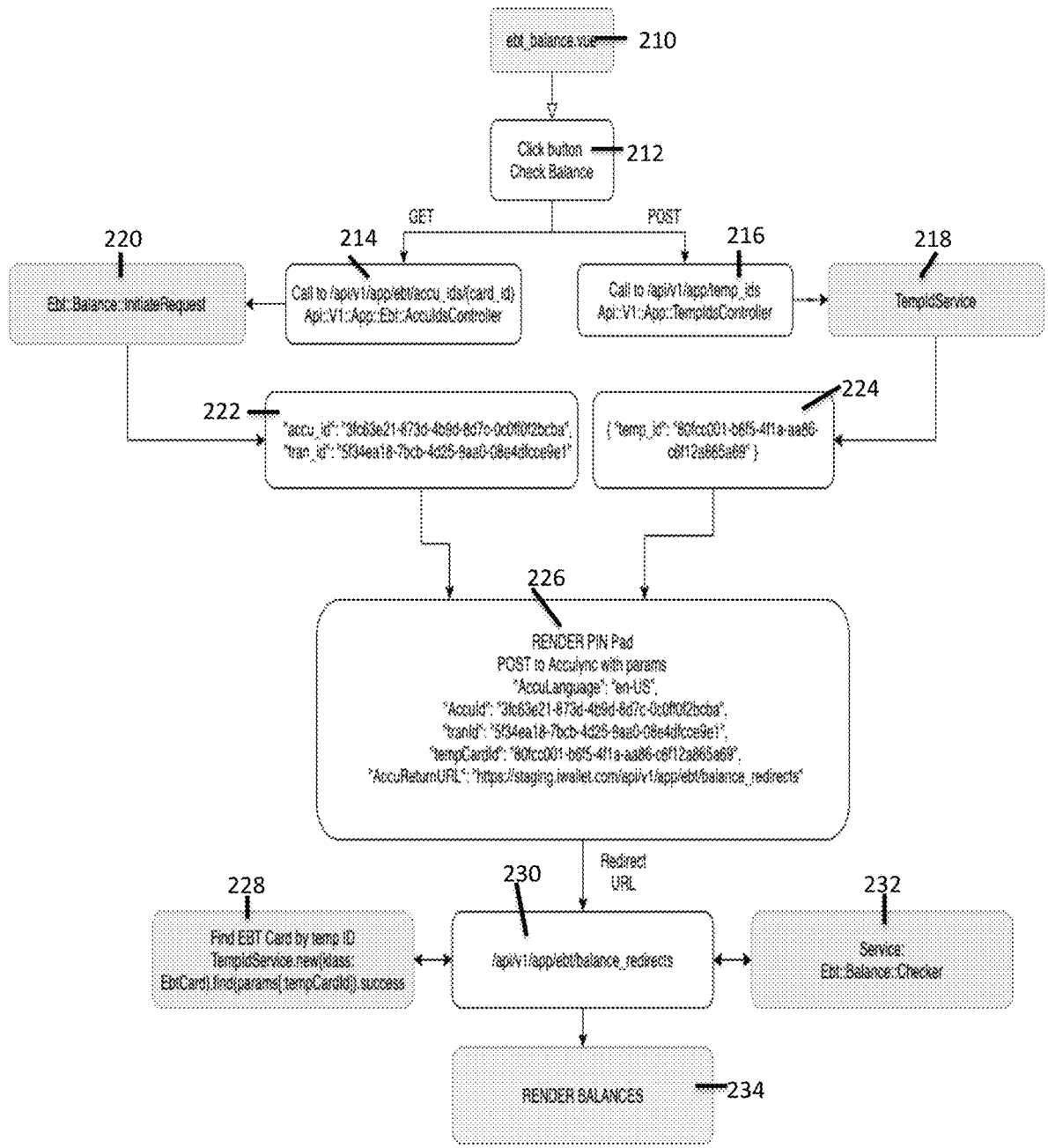
FIG. 8 depicts an exemplary flow chart that illustrates an exemplary method for checking the balance of an EBT according to various embodiments of the disclosure.
Figure 11:
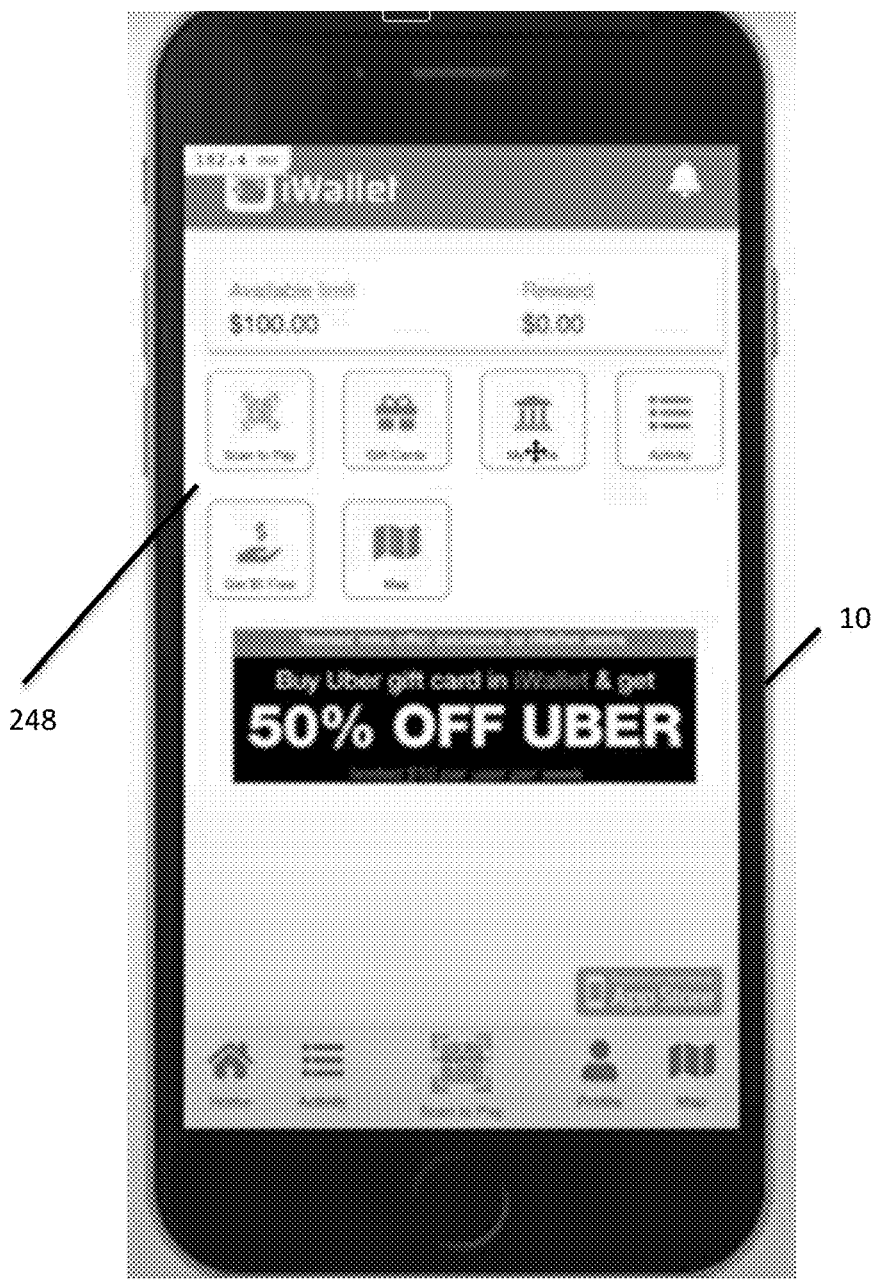
FIG. 11 depicts the home screen of the mobile application of the present invention.

FIG. 11 depicts the home screen of the web-based application 248. This screen demonstrates the options a consumer has to conduct a transaction such as a "Scan to Pay" option, "Gift Cards" option, and "My Bank" option, amongst others. This screen also allows you to view and edit your activities, profile, and map. FIG. 8 depicts an exemplary flow chart which illustrates an exemplary method for checking the balance of an EBT 210-234; and FIG. 3 depicts an exemplary flow chart which illustrates an exemplary method for returning a customer to the same profile/edit page 52-86 after signing up for e-check.

Figure 9A:
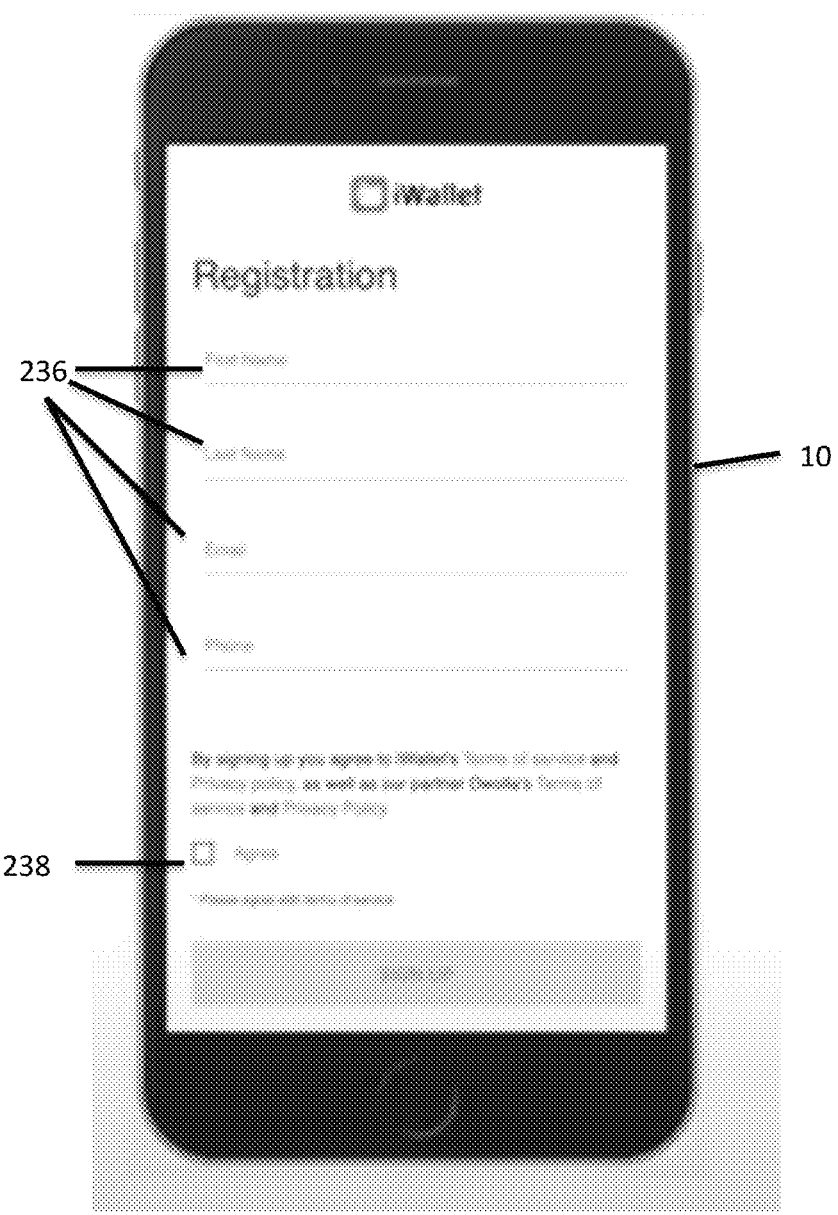
FIGS. 9A-9E depict an exemplary flow chart that illustrates an exemplary method for setting up a customer account according to various embodiments of the disclosure.
Figure 9B:
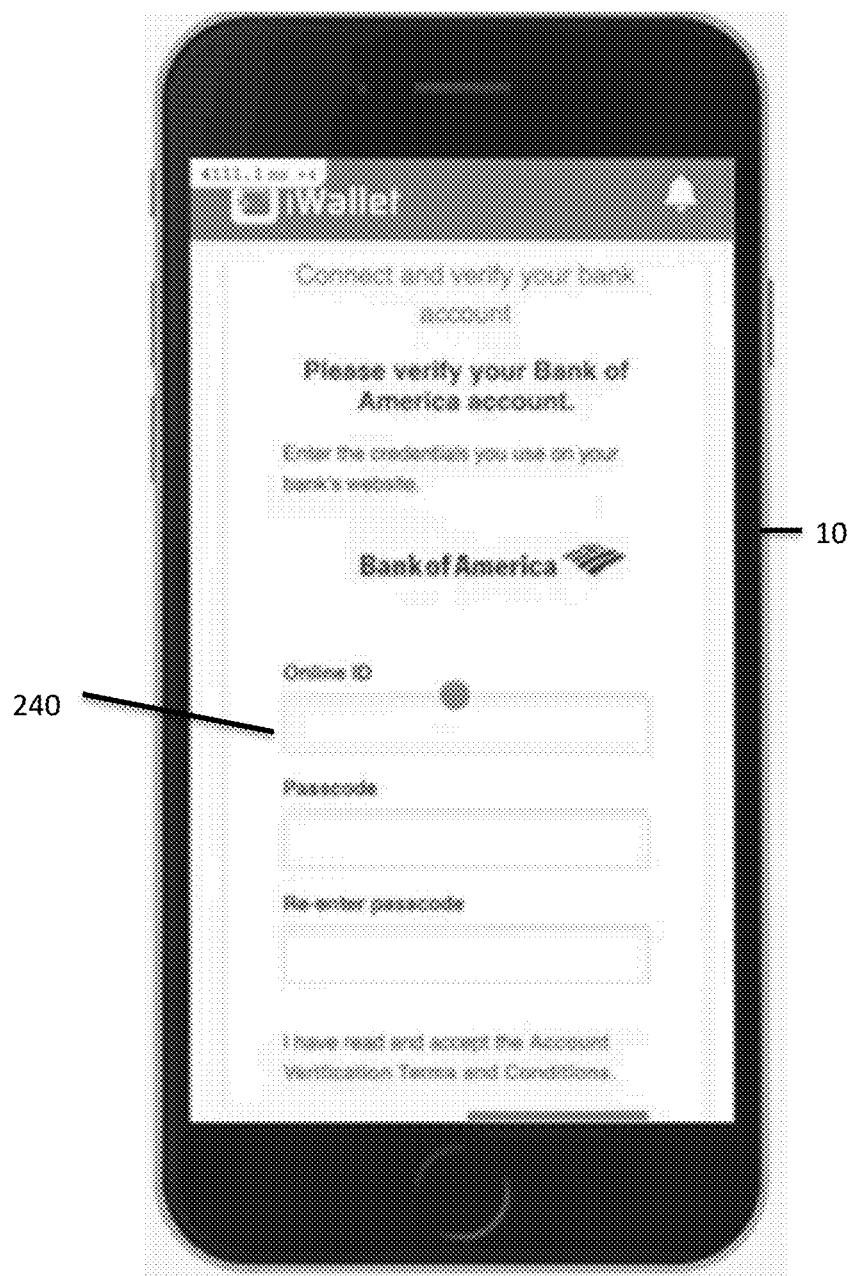
Figure 9C:
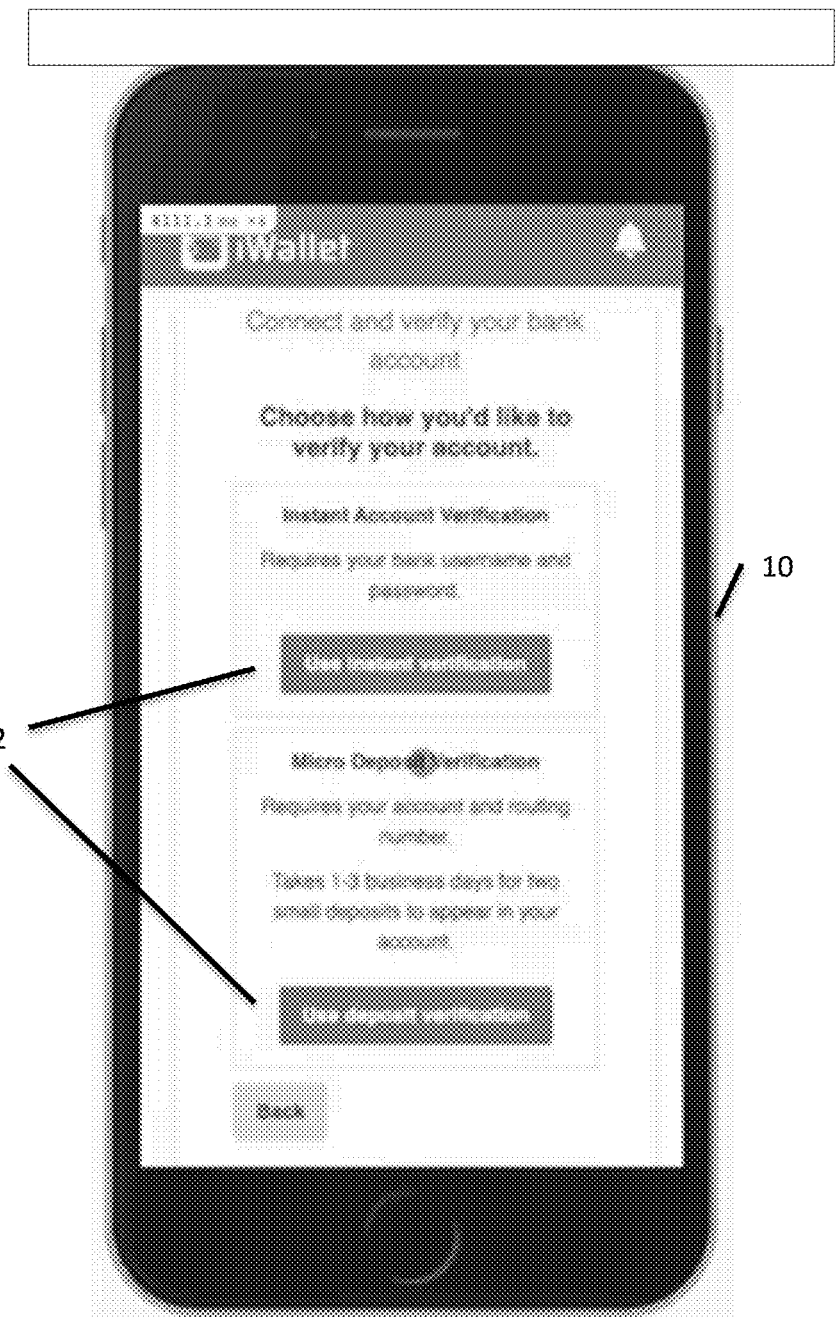
Figure 9D:
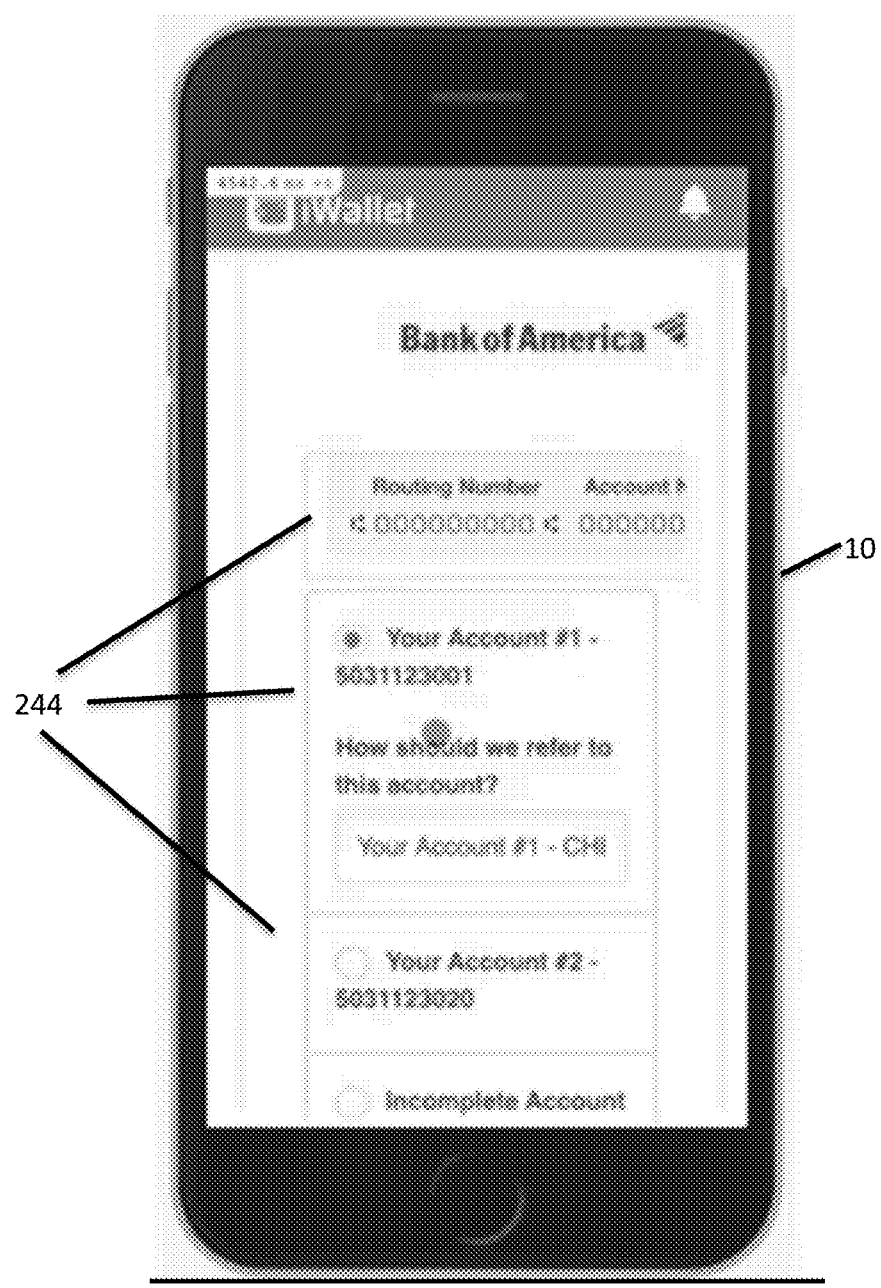
Figure 9E:

FIGS. 9A-9E depict an exemplary flow chart that illustrates an exemplary method for setting up a customer account in the order that the steps will appear on the web-application. FIG. 9a shows a registration page, here a consumer will need to input their first name, last name, email, and phone number 236 as well as click on the box indicating that they agree to the terms of service and privacy policy 238. The consumer will next need to set up a password. FIGS. 9B-9D demonstrate the next steps once the password is set, meaning the consumer will be prompted to add a bank checking account 240, then verification of the bank checking account 242. There are two ways to verify a bank account, instant account verification and micro deposit verification. The instant account verification can be verified in seconds and requires the consumer's bank username and password. The micro deposit identification requires an account number and routing number, this verification takes 1-3 business days and requires two small deposits to appear in the bank account. FIG. 9D demonstrates what the checking account will look like once added and verified 244. FIG. 9E illustrates the steps required to add the back-up credit card information 246.

In accordance with the methods of the present invention, the system is configured to perform a real time interchange detection to surcharge consumers at a fairer price. Interchange-plus is a pricing model used by credit card processors to determine the per-transaction cost paid by merchants. The model consists of two components—the interchange fee determined by the card networks and a markup set by the credit card processor itself. Historically it was only available (and interesting) to merchants, because merchants were not paying for the processing fees, but now the surcharging law changed. And when/if the consumer is paying the fee, they would want to minimize the processing fee by choosing the most optimal card to use. Interchange historically has been calculated at the end of the statement period for the merchants. The system of the present invention is configured to, using BIN and other data, to detect the fee in real time—BEFORE the transaction is processed, NOT after.

The system of the present invention is further configured to allow for automatically choosing payment method based on preferences and lowest cost in the interchange-plus pricing model, as disclosed above, based on the merchant type and payment source type.

The presently disclosed system and related method are designed to solve a problem associated with tips at a restaurant. Commercially available systems do not provide merchants with the ability of surcharging for tips at a restaurant. Because as a restaurant owner, a merchant you cannot add a fee on top of the tips on the check after the customer has left the building. For example, 3.5% may not be charged on that tip since the customer could not be notified before leaving. However, in the real-time interchange calculating system of the present invention, the tips are calculated in real-time on the customer's phone.

The system is further configured to provide merchants with secured ACH transactions. It is well known that ACH transactions are slow and can't be guaranteed. The system of the present invention is configured to use a pre-authorization feature of the credit card to secure an ACH in accordance with the following steps. For example, a consumer needs to buy a used fridge from a merchant. The consumer sends the merchant an ACH (the merchant does not ship a product yet). The consumer needs to back it up with a credit card (only costs 0.10%, not 3%). Once the ACH transaction is backed up by a credit card, the merchant sends the product (such as a fridge, for example) immediately. If the ACH bounces, the merchant captures the card charge, otherwise the card is released without the charge. The method of secured ACH/secured E-check of the present invention can include the following steps. 1. a customer account is created, 2. checking account is added, 3. credit/debit/prepaid card is added, 4. merchant decides if they accept unsecured E-checks or not, 5. in case the merchant only takes credit and secure E-check, invoice is sent by the merchant, 6. customer choses A (free E-check) or B (not free credit card), 7. in case A is chosen, then credit card is pre-authorized for a full amount (otherwise transaction is declined), 8. ACH is initiated and can take 1-3 business days to process, and 9. after confirmation of ACH payment, the credit card pre-authorization is dropped (i.e., the credit card is not charged).

In accordance with the embodiments of the present invention an ACH can be secured by various methods, including a credit card, debit card, pre-paid card, or bitcoin or the like. In one embodiment of the present invention, a merchants do not even have to change their existing credit card processor. The system of the present invention is configured to control pre-authorization and release of pre-authorization via API of any processor to secure an ACH transaction.

In some instances, the system of the present invention is configured to provide the ability for credit card payee to reverse processing fees (and cc payment) within a predetermined amount of time if they pay the same amount with ACH or other free/cheaper network. In some instances, it allows to recoup losses (using any connected payment source) in case the original ACH transaction has failed.

In accordance with the methods of the present invention, the system is configured to handle dispute resolutions, especially related to ACH. Commercially available systems and methods do not provide online solutions for handling these type of disputes. Even major credit card companies don't have access to full information/data, when speed is important at preventing disputes. The presently disclosed system is configured to provide a lot more data such as GPS, better description of the business and even notes of the transaction, for example at much higher speed of response, which is important at preventing transaction disputes that merchants hate so much.

The system is further configured to allow for USDA EBT (SNAP) card fraud detection using mobile phone sensor data (GPS, accelerometer, magnetometer, and the like) and a PIN. For example, the system is configured to track GPS data associated with financial transactions and detect an abnormality (e.g., all the transactions had been done in the vicinity of the merchant's business at a particular radius, thereby creating a pattern, however, if the transaction is associated with the GPS coordinates was outside of the historical GPS radius (not in accordance with the pattern), the system is configured to flag this particular transaction and alert the merchant).

According to some embodiments of the present invention, the system is configured to allow for refunding of excessive processing fees as follows. Maximum cap is 4% and debit surcharging is not allowed. The cost is 2%. Profit on credit is 2%, minus 1% on Debit. Plus 0.10% profit for the merchant. The rest can be refunded back to the consumer, for example, as a cashback rebate at the end of each month, or at other suitable predetermined time or times. According to another embodiment of the present invention, the remaining portion can be refunded back to the merchant, for example, as a cashback rebate at the end of each month, or at other suitable predetermined time or times. This is due to the fact that if the merchant wants to accept Debit, it usually costs 1% (and is 50% of the volume), wherein it's not permissible to surcharge Debit by law. Hence, the system of the present invention is configured to give a 0.9% cashback rebate to the merchant calculated as 1.9%-1%=0.9%, for example.

Figure 12:
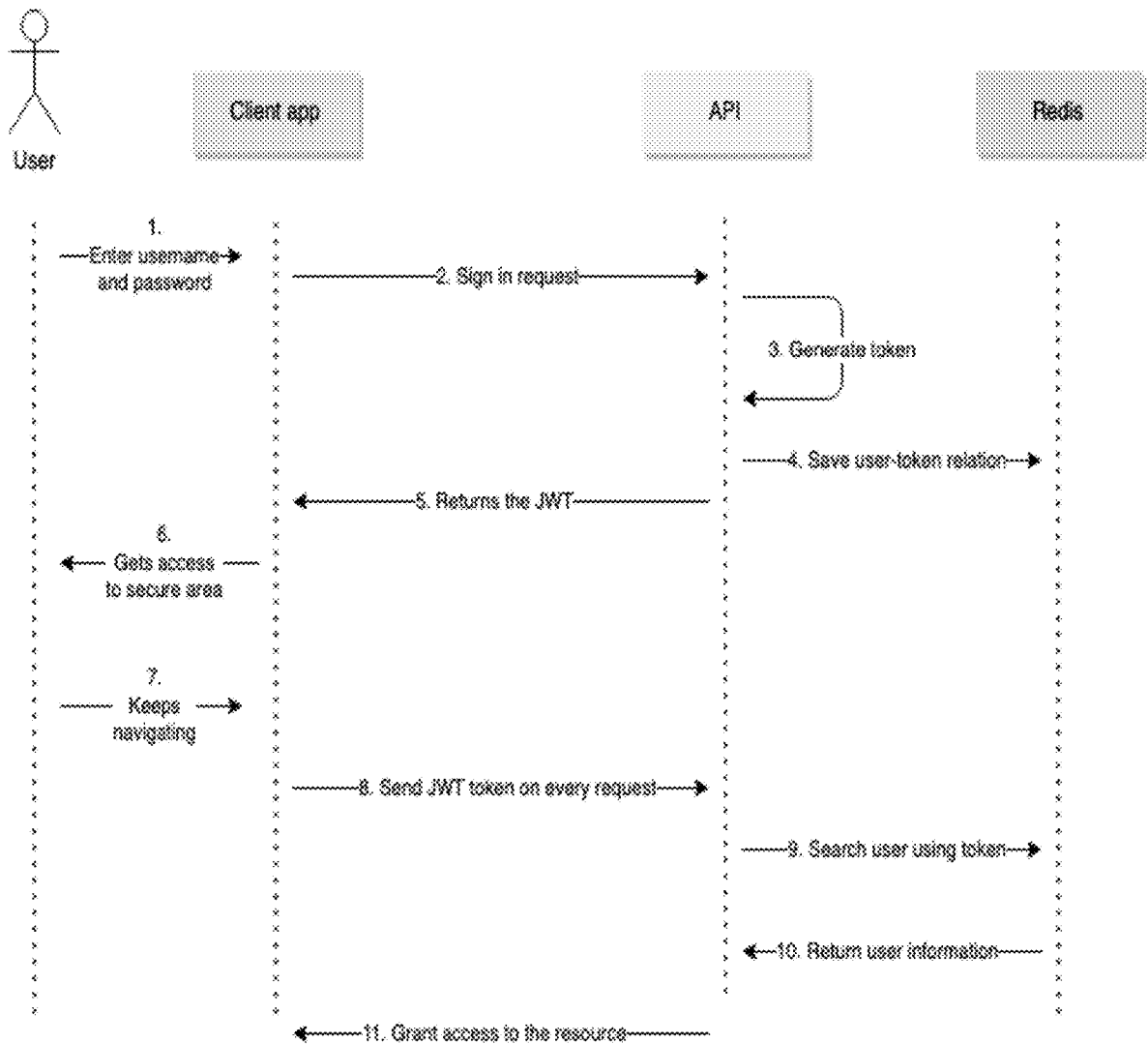
FIG. 12 is a schematic diagram illustrating the authorization system for mobile applications in accordance with the embodiments of the present disclosure.

The authorization interaction rules between a user, client application, API and Redis (servier side architectural patterns) for implementing the methods of the present invention are illustrated in FIG. 12.

The system of the present disclousre is also configured to generate a secured mobile check as part of a good check assurance practice in conjunction with the mobile remote deposit capture (mRDC) process. The system is configured to allow a merchant, when the merchant needs to accept a check from a client, to perform the following steps. The merchant can a. immediately deposit the check using a camera of the mobile device (by scanning front and back of a check), b. run that check and associated client's information through bad check database (run the name of the client or account and routing number through database to check against the transaction history and see if there were any red flags associated with bounced checks, or any other delinquencies by the client/consumer); wherein c. the client, in turn, can provide guarantee of a good check using any of the following methods ("QR pledge"): credit card, crypto tokens, any other asset classes (promissory notes, brokerage account, HELOC, or other suitable financial instruments), thereby allowing the merchant to tap into QR pledge assets of the client in case the client's check is bounced.

In some instances, the system is configured to allow the client to back up a check with other kind of pledges (i.e., additional asset class) such as digital fingerprints from the phone, various social media websites on the internet or other sources of value or truth.

The system of the present invention is also configued to issue an approval code for each financial transacton involving credit cards, checks and the like. This approval code is often written down on invoices by hand and then read back by a person or a computer. However some letters and numbers are very similar in appearance and can be easily mistaken one for another. In order to avoid any confusion, the system of the present invention is configured not to use the following letters/digits when generating an approval code: B=8, G=6, I=1=l (lowercase L), O=0, Q=D, S=5, and Z=2.

The system of the present invention is configured to prioritize transactions according to the status of the financial transaction and allows a merchant to send a text message to an end user (i.e., a consumer) so each credit card and/or ACH credit card-backed transaction is singed off (confirmed/acknowledged) by a consumer via a text message (aka no-touch e-signature). For example, the system is configured to allow the merchant to send a text message to the consumer that the financial transaction is approved. The consumer has to send back a confirmation/acknowledgment by text to the merchant. In a situation when the end user did not approve the transaction, the transaction will remain in "pending" status (aka "waiting for e-sign"). The unapproved transaction will sit at the top of the transaction list to remind the merchant that it needs to be finalized. It should be noted that the described-above e-signature confirmation process of the present invention is designed to minimize the chances of customer-originated disputes associated with financial transactions.

The system of the present invention is configured to increase the speed of processing a financial transaction by selectively allowing for a faster processing based on the consumer's financial credibility and/or behavioral patterns (i.e., regular customer, always pays on-time, and the like). The method can be described as follows (from the merchant's side), wherein the consumer scans a QR code generated by a merchant (the merchant can attached a QR code to the counter for ease of access or show a QR code on a mobile device, etc.). 1. The consumer scans the merchant's static QR code, 2. the consumer enters the amount and clicks "PAY" button, and 3. the consumer receives an approval code immediately upon clicking the "PAY" button thereby bypassing a typical route of sending an API request to the server after the "PAY" button is pressed, hence increasing the transaction speed. The described-above process of pre-authorization (aka cache) the financial transaction is designed to cut the processing time. In some instances, the system is configured to make an appearance that the transacton went through, just showing that the money was sent, without confirmation of them being received.

Likewise, the described above method can be utilized in a case where the consumer presents the merchant with the consumer's QR-code generated by the system of the present invention, and the merchant scans the consumer's QR-code to automatically withdraw a certain amount. The system allows the merchant to leverage a cached database of repeat users (consumers) with high credibility evaluated based on various parameters such as financial credibility, spending patterns, GPS data and the like) to improve the speed of financial transactions.

The system of the present invention is also configured to allow, for the benefit of consumers, to automatically choose and prioritize the most optimal payment method or methods. For example, considering a consumer wants to pay for a shopping cart using an EBT (SNAP USDA) card (so-called food stamps) or other cards/crypto or other asset classes. There might be some items that are non-EBT eligible or a user/consumer can run out of EBT money. If the consumer has more than one payment source saved in the system of the present invention, the system can automatically select and use the next preferred payment source on the list to improve the speed of transaction and to realize potential savings. Thus, the system of the present invention is configured to allow the consumer to determine preferred payment methods and create a priority list from which the system will automatically select and use a payment method in order of priority. In addition, the system is also configured to recommend to the consumer a preferred payment method or methods specific to a particular consumer.

The system is also configured, for the benefit of the merchant, to help the merchant conduct financial transactions through most favorable route or routes (using processors such as NYCE, FIS, Clober and the like). The system allows the merchant to create and store a merchant-specified priority list of processors. The system is also configured to recommend and automatically choose a preferred processing route based on cost, speed of transactions, number of declines and general rating associated with a particular processor.

The system of the present invention is configured to generate a QR code that combines multiple functions by providing a link to a customizable landing page linked not only to various applications for conducting financial transactions such as Zelle, Venmo, Apple Pay and the like, but also to other kind of applications, pictures, pdf (restaurant menus, for example), social media sites and more. It provides the ability for the merchants as well as consumers to create landing pages with multiple payment options and other valuable information and applications. For example, a consumer attending a restaurant can be presented with a QR code provided by a merchant with a link to a landing page with multiple payment options and a restaurant menu, as well as the means to order the food to go or reserve a table, along with the nutritional information about the food provided by the merchant.

According to another embodiment of the present invention, the system provides a check cashing/conversion on demand at the local financial branch as a service, for the benefit of merchants. Since the merchants might wish to get a check cashed faster, the merchant may employ a gig-worker or an employee to pick up a check from the merchant's site and then go to a physical branch and convert the check into cash or cashiers check or any other guaranteed asset such as checking account transfer in the same bank. For this purpose, the system of the present invention is configured to provide a list of gig-workers for the merchant to order check cashing on-demand service. In some instances, a financial institution such as a bank, might choose to accept an image of the check instead of the actual physical check. In this case, a gig-worker does not have to pick up a physical check from the merchant but only needs to receive a virtual copy of the check, and the system of the present invention is conveniently configured to send an image of the check to a gig-worker to perform the task without the need to pick up the check on-site from the merchant.

The system of the present disclousre includes an advanced bad check management module configured to send notifications to the consumer with options to remedy the situation when the consumer initiated financial transaction did not go through (credit card declined, check bounced, etc.) by offering to the consumer to extend a payment date or breaking down the required amount to be paid into small portions. Likewise, the system can send to the merchant a notification that the consumer chose to remedy the situation and how the consumer is going to do that. The method applied to a situation where a mobile check deposit was rejected by the bank for any reason can be described in more detail as follows. Providing that the system contains consumer's information and consumer's secured assets (such as a credit card, for example), the following method of the present invention can be applied. 1. Payee and payer will automatically be notified (by sms/email/messenger or any other means). 2. Payer will have an option to use their other payment source or allow the check to be re-deposited. 3. Payer will have the ability to contact customer support to clarify the situation (clerical errors, etc.). 4. Payee will have the option of charging a bad check penalty fee or wave the penalty fee. 5. Check re-deposit can be scheduled immediately or at a certain future date. 6. Before re-depositing the check can be run against extra layers of verification (other more expensive databases) that are normally not done due to extra costs. 7. Payer might have an ability to communicate with the payee electronically to settle the bad check by some other means.

Modern banks still process paper checks, which are usually transmitted as images, once scanned via the mobile remote deposit capture (mRDC). The system of the present invention allows a user to scan images of both sides of a check using a mobile computing device such as a smart phone or the like (just like a typical modern banking), however, the system of the present disclosure provides the ability to access mobile check deposits to any sub-account, unlike with a typical modern banking system wherein the access is granted for only the main account holder.

Additionally, the system of the present invention includes a QR-code-to-instrument converter module configured to generate a virtual check using all the required information linked to a QR code, in cases where a merchant or a consumer does not have a physical hard copy of a check book. Instead of providing a paper check version a payer can provide a QR-code that will contain all the needed information, the QR-encoded information such as: a. account/routing number, b. amount, c. date, d. payee name (i.e., who the check is made out to) e. signature, and f. check number. Similarly, the system can generate a void check, in cases where a void check is required by a financial institution to set up an automatic payments, for example.

A payee can scan the encoded QR-code, and the system is configured to decode it into a regular paper check image, allowing the payee to endorse it in the back of the check as usual, but electronically, and submit it to the bank as an image-check for processing (hence, generating a virtual check image of a filled out check with endorsement on the back, amount, payable to, etc.). In some instances, the system can store the payee's signature and endorse the check automatically with payee's permission or pre-authorization.

The information with the QR-encoded check can also be encrypted, so in order for Payee to be able to decrypt it, a Payer will have to provide a passcode using the following methods: a. Passcode can be sent by SMS for security, b. Passcode can be generated by a time-based pre-approved Authorization applications, c. Passcode can be pushed as a push notification, d. Passcode can be transmitted verbally, e. Passcode can be presented as a 2nd QR-code, or f. Passcode can be stored on a USB-memory device.

It will be appreciated by a person skilled in the art that the method of creating a virtual check as described above can be applied to QR-encoding credit cards, invoices/bills or and any other documents or financial instruments. For example, to generate virtual invoices linked to generated QR codes (for proof of "paid in full") with or without security features, or for other non-fungible QR codes (like promissory note or warranty or proof of service, or proof of payment) with or without security features as described above in relation to the process of generating a virtual check.

In some instances of the present invention, the system includes a monthly statement monitoring tool ("hidden fees guard") for the benefit of both merchants and consumers. It's common in the financial world to have free tools to analyze a credit card merchant statement to see businesses' true costs of processing, because some processors pad interchange, add hidden fees, etc. Some credit card processors increase processing fees from month to month, by just printing a small font text at the bottom of statements. Since business owners usually don't know how (or don't have time) to properly monitor this type of information, their credit card processing fees often get out of control.

The system of the present invention provides a merchant credit card statement monitoring service. The merchants can instruct the processor to send a copy of their monthly statements by fax/email/mail/etc. to a special monitoring service module provided by a system of the present invention. That service module is configured to automatically monitor all the changes and will alert the business if something went wrong and needs the owner's attention. The same methods can be applied to other bank monthly statements such as checking accounts, credit cards, loans, insurance, brokerage accounts and the like. The system is also configured to provide the same monitoring service as described above to consumers, allowing the consumers to track hidden fees in credit card statements and be alerted with regard to various deadlines such as loan payoff due dates, etc.

The system of the present invention is also configured to provide an extra level of security to financial institutions and their customers when it comes to financial transactions involving cashing and depositing checks. Each bank has its own policies regarding cashing and depositing checks, but virtually every bank in the United States (and in many if not most countries in the world) requires that a payee endorse a check to accept it. Because of the rising incidence of check fraud and theft, banks require checks be endorsed. Endorsement can take various forms and could include wording such as "For deposit only" or the like, or digits, like the account number. It can also have a media file like a signature (or driver's license, or other IDs, or physical fingerprint, or digital fingerprints). The system of the present invention is configured to generate and add a small QR-code linked to a check, thereby providing a bank and a check writer an extra level of security. The QR-code can be embedded into a physical check or a virtual check generated by the system of the present invention as discussed supra, or can be stored in a separate location or in any digital or print form (such as a database, email, SMS text message for example). This approach of endorsing a check with a QR-code enables users with a two-way tracking. With regard to tracking on bank's or payer side, a QR-code can automatically help identify a person or business making a deposit (especially in cases where a person is not a signer on that account), which can help with tracking down a check later, should any issues associated with the check arise. With regard to tracking on the payee side, a QR-code can contain payer information such as service address, ID, name, invoice number, etc. So that if the check bounces, a payee can quickly identify a person who wrote this check, even if the information on the front of the check is missing.

The system of the present invention is configured to increase the speed of the mobile remote deposit capture (mRDC) process. It makes the funds available immediately to verified merchants as well as secured-type of processing merchants as described above (i.e., if a financial transaction such as ACH is backed by a credit card, the system is configured to issue an advanced funding immediately, because the risk of such transaction is low).

The system of the present invention is also configured to provided risk management for secured or non-secured mRDC/ACH financial transactions based on certain criteria. Some mRDC/ACH transactions might be funded immediately, and some may be held for extra time to clear, based on one or more of the following parameters: a. how the transaction was secured (e.g., backed by credit card, etc.), b. history of transactions, c. amount, d. GPS location patterns, e. device digital fingerprints patterns, and f. check writer's personal information or absence of that information.

In some instances, the system of the present invention provides users with the partial mRDC check refund ability via ACH. Once the check routing/account numbers are read by the system of the present invention, it provides the merchant and the customer with the ability to negotiate and agree to additional special terms, thereby enabling the merchant to refund the customer a partial refund by depositing it back to the customer's account (for example, an installation of an equipment was longer than agreed upon and the customer demanded a partial refund).

In some instances, the system of the present disclosure is configured to allow for partial mRDC check extra charges via ACH beyond written amount. Since the check routing/account numbers were read by the system, the merchant can have a check writer agree to special terms beyond the amount written on the check. In these terms routing/account numbers will be used by the system of the present invention to add any extra charges if needed without requiring the customer to write a new check, thereby eliminating extra paperwork and saving time and effort.

The system of the present invention is also designed to import an mRDC image of the check not only from camera, but also from other media sources such as emails, SMS, ftp, skype, messengers and the like, making it possible for the user (be it a merchant or a consumer) to submit any kind of image of the check for processing.

Figure 13:
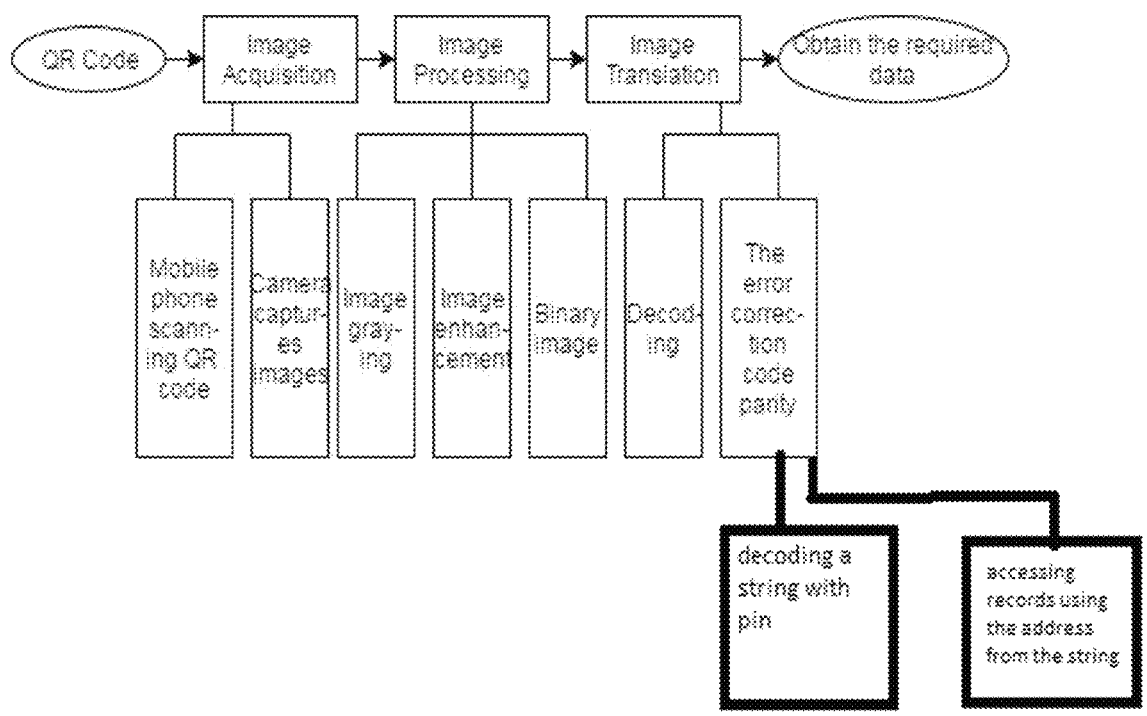
FIG. 13 is a schematic diagram illustrating a method of reading QR-encoded checks in accordance with an embodiment of the present invention.

In some instances, the system of the present invention is designed not only to create QR-encoded checks, as previously discussed, but also to read QR-encoded checks, store the information and convert it into a check, if needed. The exemplary method of obtaining the required data from a check in accordance with the present invention is illustrated in FIG. 13.

The system of the present disclosure can be configured to create recurring transactions from a single mRDC check image (e.g., to set up a monthly rent payment or membership fee). Once the check's routing/account numbers are read off of the check image, the system can store that information and allow the merchant to bill the customer on a regular recurring basis.

The system of the present invention is also configured to bill a check writer (not a merchant) processing fees by extracting account/routing numbers from mRDC and running an extra ACH transaction. Because a check's routing/account numbers can be saved off of the check image, that means that the system of the present disclosure can save that info and run any extra debit or credit transactions for processing fees, thereby allowing a processor to charge extra fee (if, for example, a customer's check was bounced due to insufficient funds).

The system of the present disclosure is also configured to extract from a check the information of a check writer (such as full name, address, amount, etc.). Unlike all modern commercially available software-based systems which are not designed to analyze any other check information except routing/account numbers, the system of the present invention can extract and store other information that is written on the check, which can be used to detect and evaluate the check risk profile.

The system is also designed to encode the check writer's name, address, other information (such as account/routing numbers), or combination thereof using a QR-code to be used on the check with or instead of the text printed on the check in the top left corner.

The system of the present invention is further configured to create a non-fungible token (NFT) for each check to prove its uniqueness utilizing the block-chain technology. That token can be in the form of a QR-code, which can be printed on a check. The token can comprise numbers, letters, or combination thereof, unique for each check.

The system of the present disclosure is also designed to upload a check image or check data to a blockchain (a digital ledger such as Ethereum, for example) to prove the check's uniqueness and/or authenticity.

Figure 14:
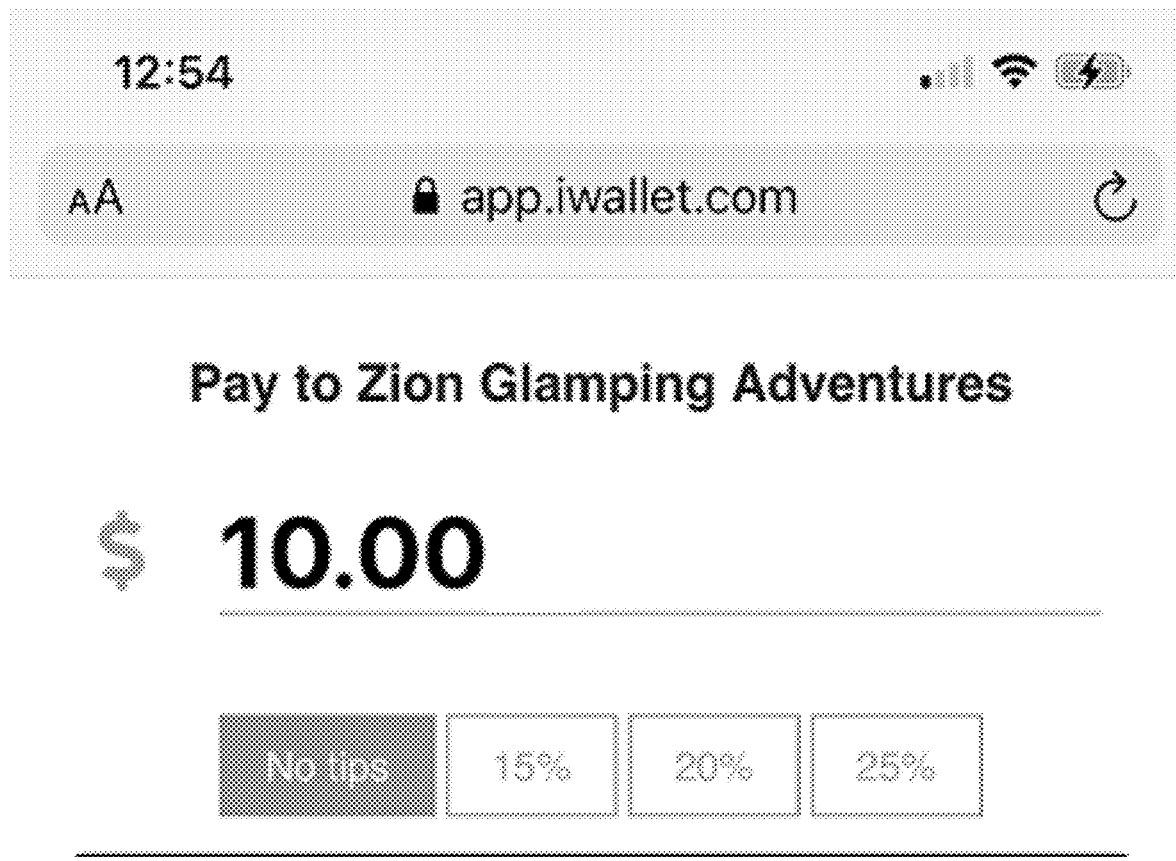
FIG. 14 is a screenshot of the application allowing a check writer to add a tip amount upon confirmation.

The system of the present invention is configured to provide a check writer with the ability to add tips as part of confirmation when writing a check, wherein the tips are charged through the ACH network as a separate transaction. It's a critical functionality for the benefit of merchants, because so many people in the hospitality industry in the US depend on tips. In accordance with the method of the present invention, when a merchant needs to process a check, a merchant would need to take a picture of the check, then an sms or email will be sent to the check writer to confirm the amount and accept the terms of service (such as penalties for bad check, etc). Right there on the same confirmation page, a check writer will be able to give tips as illustrated in FIG. 14.

The system of the present invention is configured to provide the ability for depositing mobile checks by end consumers (i.e., check writers) remotely, in case where a check writer is remote (not present on-site to accept with the mobile application) and would like to pay by check. The system of the present invention is configured to allow a merchant to send a web link to the check writer by email, sms, messenger, or the like, where the check writers will be able to process a deposit using their mobile phones. Such remote payment by customer to the merchant's bank account provides a more secure way of payment. In some instances, the system is configured to split the payment in accordance with the consumer's instructions. For example, a customer can write a check for $500 and the system can split it five ways, sending $100 for each merchant as per customer's instructions, thereby allowing customers to choose to whom and how much to pay (such as in general contractor/subcontractors scenario).

The system of the present invention is configure to provide extra security for the benefit of the merchants as well as processors for transactions involving remote mobile check deposits by the end consumer/check writer. In some instances, the system is configured to request security information to verify the identity, which may include a remote drivers license or any other ID image upload by web link and/or SSN and DoB for verification purposes.

The system of the present invention is also configured to select surcharging fee based on the amount of a transaction using a sliding scale approach, predicating on the fact that up to certain amount customers are willing to pay legally allowed 4%, but larger amounts demand lower processing fee, for example 3% for amounts over $500 and 4% for under $500. The system is configured to adjust the surcharging fees based on the amount (for example, the larger the amount the lesser the surcharging fee, using a sliding scale approach charging consumers based on the amount of the financial transaction). In some instances, the system is configured to provide merchants with the ability to adjust the surcharging fees using the sliding scale approach dependent on the amount of financial transaction.

The system of the present invention is configured to provide the ability for merchants to add an e-invoice when sending a check request wherein the invoice and a check request (payment link) are sent together to a consumer. In some instances, the system is configured to generate an invoice with the embedded payment link, which can be linked with secured ACH or mRDC or virtual check.

The system of the present invention is configured to provide merchants and/or processors with the ability of choosing payment method manually using checkboxes, for example or dynamically based on perceived risk such as external data associated with the customer's profile, for example. Thus, the system provides merchants and/or processors with the ability to choose a payment method (i) manually or (ii) automatically (e.g., based on the credit score, type of merchant transaction, merchant category code (MCC), credit load (debt to income profile) or the like), or (iii) processing fees can be automatically adjusted based on the risk profile (for the benefit of merchants and/or processors).

There is a new instant payments network that the largest banks in the US created in 2017 called Real Time Payments (RTP). It uses the same routing/account #s as an ACH network, it just needs to be sent for processing to a different server. It covers now only about 50%-70% of the population, so it's not widely used yet. The advantage of the new RTP network is that the transfer is instant (unlike 1-3 days for ACH). The system of the present invention is configured to determine if a transfer is eligible for RTP (based on a routing number) and if so, process it immediately, such that a "secured transaction" as described above will not be needed. Similarly, it applies to mRDC transactions: if the system of the present invention detects that a paper check is eligible for RTP, it runs an instant transaction via RTP, rather than waiting for a slower ACH processing.

Figure 15:
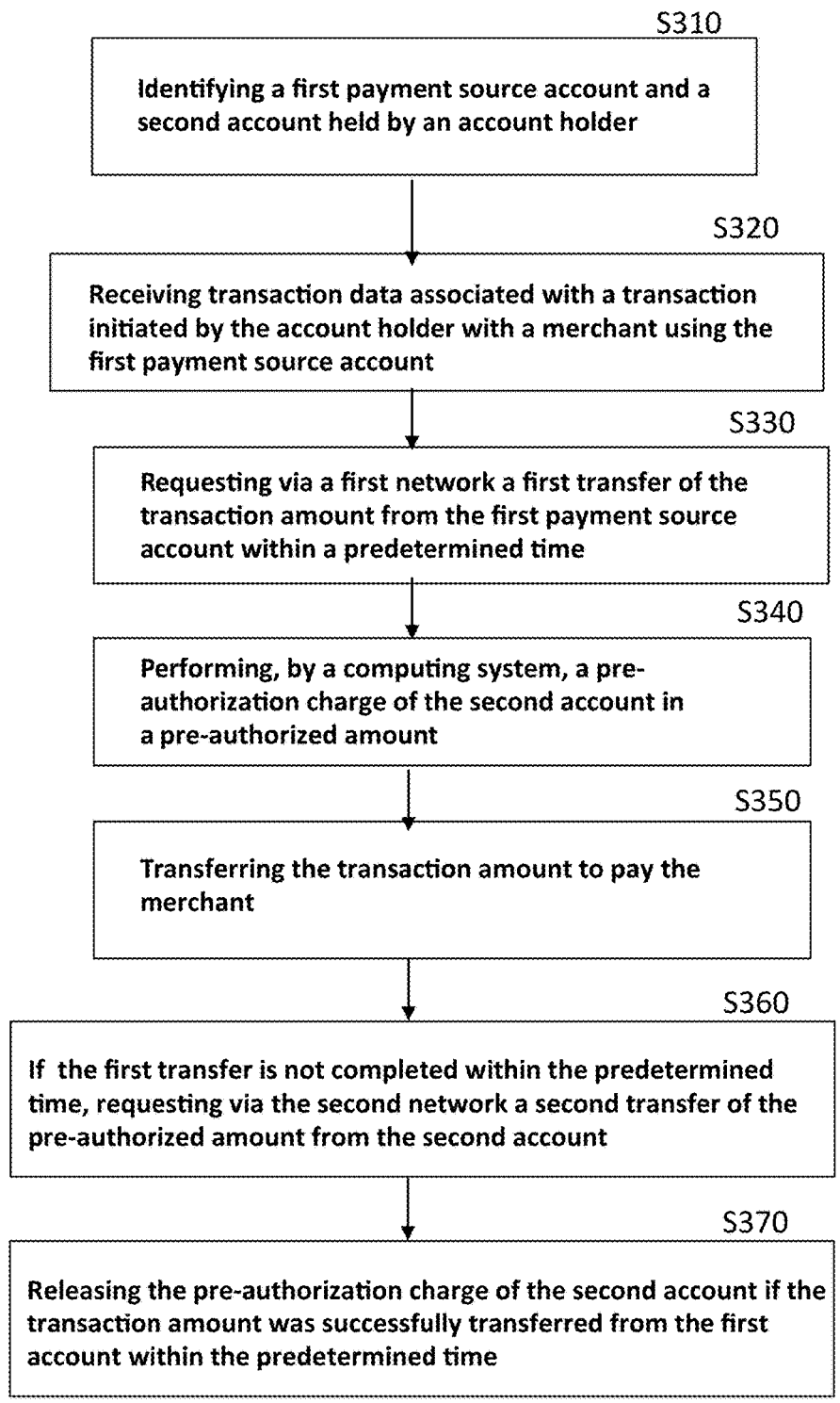
FIG. 15 is a block-diagram illustrating a method of conducting a secure financial transaction in accordance with an embodiment of the present invention.

A method for conducting secure electronic financial transactions in accordance with an embodiment of the present invention in illustrated in FIG. 15. Method 300 includes identifying, by a computing system, a first payment source account held by an account holder and a second account held by the account holder (step 310), receiving, by computing system, transaction data associated with a transaction initiated by the account holder with a merchant using the first payment source account, the transaction having a transaction amount (step 320), requesting, by a computing system, via a first network a first transfer of the transaction amount from the first payment source account within a predetermined time (step 330), performing, by a computing system, a pre-authorization charge of the second account in a pre-authorized amount (step 340); transferring the transaction amount to pay the merchant (step 350), if the first transfer is not completed within the predetermined time, requesting, by a computing system, via the second network a second transfer of the pre-authorized amount from the second account (step 360), and releasing the pre-authorization charge of the second account if the transaction amount was successfully transferred from the first account within the predetermined time (step 370). It will be understood by a person skilled in the art that the account holder can be a direct account holder or a co-signer or a person who has access to the account by proxy or by virtue of other legal means. The pre-authorization charge can be equal to the full transaction amount or can be a percentage of the full transaction amount (for example, it can be equal to the 50% percent of the total transaction amount); in some instances, it can be more than the transaction amount (especially in cases involving transactions of higher risk wherein the credibility of the account holder is low, for example). It will be understood by a person skilled in the art that the step of transferring the transaction amount to pay the merchant (step 350) means transferring funds equal to the transaction amount.

The system is also configured to impose a processing fee on the transaction at the rate being a percentage of the transaction amount. In some instances, the processing fee can be imposed on the pre-authorization charge. The processing fee can be also imposed on a tip amount. The system is also configured to adjust a processing fee imposed on the transaction for the account holder based on risk assessment data before the transaction is processed. The risk assessment data can include phone sensor data such as GPS coordinates, accelerometer, magnetometer, BIN, transaction amount, credit score, type of merchant, type of payment source, debt to income ratio, time of the day, GPS location, social media profile, own IP address history and from other sources, user-agent history, history of phone calls, connected funding sources, movement of funds between funding sources, email domain, original registration information, prove of digital identity from other blockchain services. The system is also configured to adjust a processing fee for the merchant based on the risk assessment data as defined above.

According to the method of the present invention, the system is configured to refund excessive processing fee back to the merchant or to the account holder. The first network can be an automated clearing house (ACH) network and the first transfer is an ACH transfer. In some instances, the first network can be mobile remote deposit capture (mRDC) network and the first transfer is an mRDC transfer. The second account can include a credit card, debit card, prepaid card, crypto account, brokerage account, or bank account, or combination thereof. The system is also configured to reverse processing fees within a predetermined amount of time to the account holder.

According to the method of the present invention, the system is configured to perform a dispute resolution and fraud detection based on the risk assessment data as defined above.

The method can also include the step of generating a secured mobile check as part of a good check assurance practice by allowing the merchant to deposit the check using a camera of a mobile device; running the check and associated client's information through a bad check database; and providing by the account holder a guarantee of a good check using QR-code generated link to the second account; thereby allowing the merchant to tap into the assets of the second account. It can also include the step of issuing an approval code for each transaction, wherein the code does not include the letters/digits selected from B=8, G=6, I=1=l (lowercase L), O=0, Q=D, S=5, and Z=2; thereby avoiding confusion associated with the similarities between letters and digits.

In some instances, the method can include the step of marking the transaction as pending until the transaction is approved by the account holder. The approval of the transaction by the account holder can include the approval of the terms of the transaction. The method can include the step of increasing the speed of the transaction based on the account holder's financial credibility by adjusting the predetermined time.

The second account can include one or more accounts and the pre-authorization charge of the second account can be made using one or more accounts (for example a pre-authorized charge of $10,000 can be divided up among several accounts, such that, for example, $5000 is charged to a first credit card and another $5000 is charged to a second credit card). The ACH pre-authorization release time can be adjusted based on the transaction amount or risk of transaction based on the risk assessment data (e.g., the pre-authorization can be held for 60 days for a high-risk transaction and for 20 days for a lower risk transaction).

According to some embodiments of the present invention, the system can be integrated into various web-based, mobile and desktop applications (such as wordpress/Chrome/quickbooks, etc.) by virtue of plug-ins thereby allowing users to conduct financial transactions as described above while using various applications. For example, the quick books reconciliation plugin configured for automatically downloading approved transactions to QuickBooks.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A method for conducting secure electronic financial transactions, comprising: identifying, by a computing system, a first payment source account held by an account holder and a second account held by the account holder; encrypting with a public digital key transaction data associated with a transaction initiated by the account holder with a merchant using the first payment source account, the transaction having a transaction amount; receiving, by the computing system, the encrypted transaction data associated with a transaction initiated by the account holder with a merchant using the first payment source account, decrypting the encrypted transaction data with a private digital key; requesting, by the computing system, via a first network a first transfer of the transaction amount from the first payment source account within a predetermined time; performing, by the computing system, a pre-authorization charge of the second account in a pre-authorized amount; transferring the transaction amount to pay the merchant; if the first transfer is not completed within the predetermined time, requesting, by the computing system, via the second network a second transfer of the pre-authorized amount from the second account; and releasing the pre-authorization charge of the second account if the transaction amount was successfully transferred from the first account within the predetermined time.

2. The method of claim 1, wherein a processing fee is imposed on the transaction at the rate being a percentage of the transaction amount.

3. The method of claim 1, wherein a processing fee is imposed on the pre-authorization charge.

4. The method of claim 1, wherein a processing fee is imposed on a tip amount.

5. The method of claim 1, wherein a processing fee imposed on the transaction is adjusted for the account holder based on risk assessment data before the transaction is processed.

6. The method of claim 1, wherein a processing fee is adjusted for the merchant based on risk assessment data.

7. The method of claim 1, further comprising refunding excessive processing fee back to the merchant or to the account holder.

8. The method of claim 1, wherein the first network is an automated clearing house (ACH) network and the first transfer is an ACH transfer.

9. The method of claim 1, wherein the first network is a mobile remote deposit capture (mRDC) network and the first transfer is an mRDC transfer.

10. The method of claim 1, wherein the second account comprising a credit card, debit card, pre-paid card, crypto account, brokerage account, or bank account, or combination thereof.

11. The method of claim 1, further comprising reversing processing fees within a predetermined amount of time to the account holder.

12. The method of claim 1, further comprising performing a dispute resolution based on data.

13. The method of claim 1, further comprising detecting a fraud using data.

14. The method of claim 9, further comprising generating a secured mobile check as part of a good check assurance practice by allowing the merchant to a. deposit the check using a camera of a mobile device; b. running the check and associated client's information through a bad check database; and c. providing by the account holder a guarantee of a good check using QR-code generated link to the second account; thereby allowing the merchant to tap into the assets of the second account.

15. The method of claim 1, further comprising issuing an approval code for each transaction, wherein the code does not include the letters/digitals selected from B=8, G=6, I=1=l (lowercase L), O=0, Q=D, S=5, and Z=2; thereby avoiding confusion associated with the similarities between letters and digits.

16. The method of claim 1, further comprising marking the transaction as pending until the transaction is approved by the account holder.

17. The method of claim 1, further comprising increasing the speed of the transaction based on the account holder's financial credibility by adjusting the predetermined time.

18. The method of claim 1, wherein the second account further comprising one or more accounts.

19. A system for conducting secure electronic financial transactions, the system comprising: one or more processors; and one or more memories having stored thereon instructions that, when executed by the one or more processors, cause the one or more processors to: identify a first payment source account held by an account holder and a second account held by the account holder; encrypt with a public digital key transaction data associated with a transaction initiated by the account holder with a merchant using the first payment source account, the transaction having a transaction amount; receive the encrypted transaction data associated with a transaction initiated by the account holder with a merchant using the first payment source account; decrypt the encrypted transaction data with a private digital key; request via a first network a first transfer of the transaction amount from the first payment source account within a predetermined time; perform a pre-authorization charge of the second account in a pre-authorized amount; transfer the transaction amount to pay the merchant; if the first transfer is not completed within the predetermined time, request via the second network a second transfer of the pre-authorized amount from the second account; and release the pre-authorization charge of the second account if the transaction amount was successfully transferred from the first account within the predetermined time.

20. A non-transitory physical computer storage comprising computer-executable instructions that, when executed by one or more computing devices, configure the one or more computing devices to: identify a first payment source account held by an account holder and a second account held by the account holder; encrypt with a public digital key transaction data associated with a transaction initiated by the account holder with a merchant using the first payment source account, the transaction having a transaction amount; receive the encrypted transaction data associated with a transaction initiated by the account holder with a merchant using the first payment source account; decrypt the encrypted transaction data with a private digital key; request via a first network a first transfer of the transaction amount from the first payment source account within a predetermined time; perform a pre-authorization charge of the second account in a pre-authorized amount; transfer the transaction amount to pay the merchant; if the first transfer is not completed within the predetermined time, request via the second network a second transfer of the pre-authorized amount from the second account; and release the pre-authorization charge of the second account if the transaction amount was successfully transferred from the first account within the predetermined time.

* * * * *